July 12, 1949.

F. G. PURINTON 2,476,219

ROTARY TRANSFER MOLDING DEVICE

Filed Nov. 21, 1946

Inventor
Forrest G. Purinton
by
Seymour, Earle & Nichols
Attorneys

July 12, 1949.  F. G. PURINTON  2,476,219
ROTARY TRANSFER MOLDING DEVICE
Filed Nov. 21, 1946  7 Sheets-Sheet 2

Inventor
Forrest G. Purinton
by Seymour, Earle &
Nichols
Attorneys

July 12, 1949.   F. G. PURINTON   2,476,219
ROTARY TRANSFER MOLDING DEVICE
Filed Nov. 21, 1946   7 Sheets-Sheet 3

Inventor
Forrest G. Purinton
by Seymour, Earle & Nichols
Attorneys

July 12, 1949.　　　　F. G. PURINTON　　　　2,476,219
ROTARY TRANSFER MOLDING DEVICE
Filed Nov. 21, 1946　　　　　　　　　　　　7 Sheets-Sheet 4
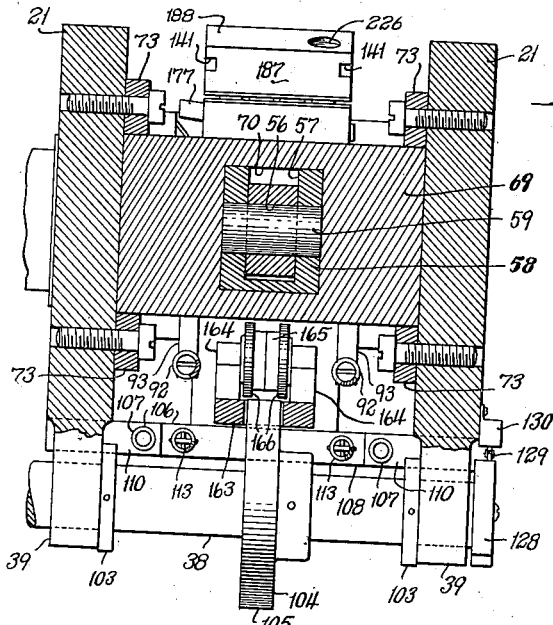
Fig. 4.
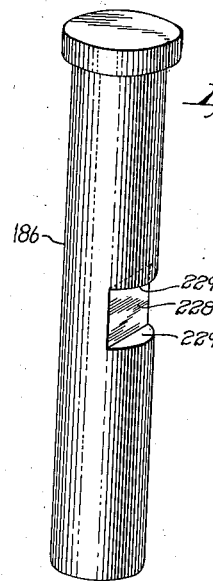
Fig. 9.
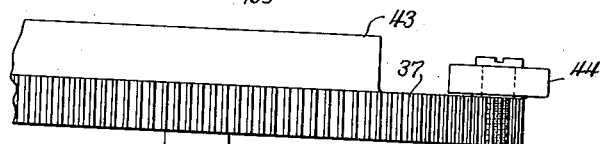
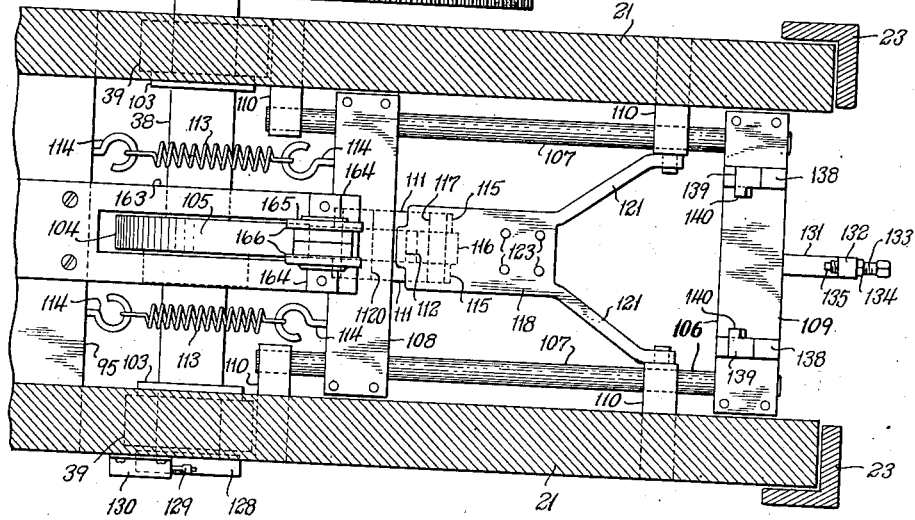
Fig. 5.
Inventor
Forrest G. Purinton
by Seymour, Carter & Nichols
Attorneys July 12, 1949.  F. G. PURINTON  2,476,219
ROTARY TRANSFER MOLDING DEVICE
Filed Nov. 21, 1946  7 Sheets-Sheet 5

Inventor
Forrest G. Purinton
by Seymour, Earle & Nichols
Attorneys

July 12, 1949.　　　　　F. G. PURINTON　　　　2,476,219
ROTARY TRANSFER MOLDING DEVICE
Filed Nov. 21, 1946　　　　　　　　　　　　7 Sheets-Sheet 6
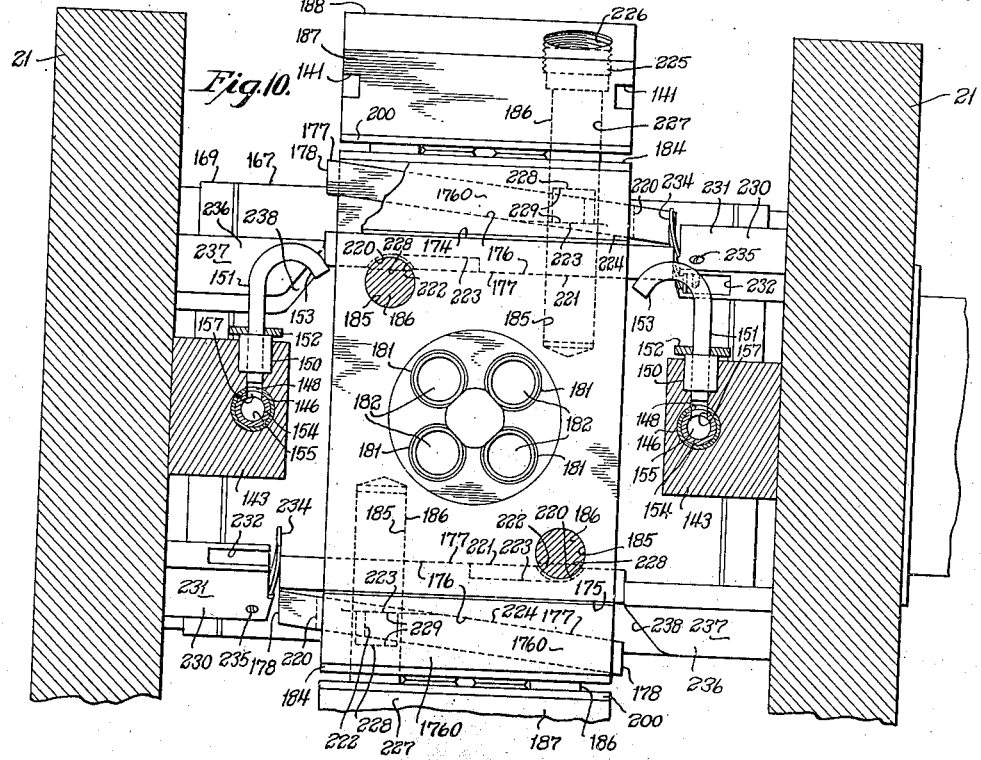
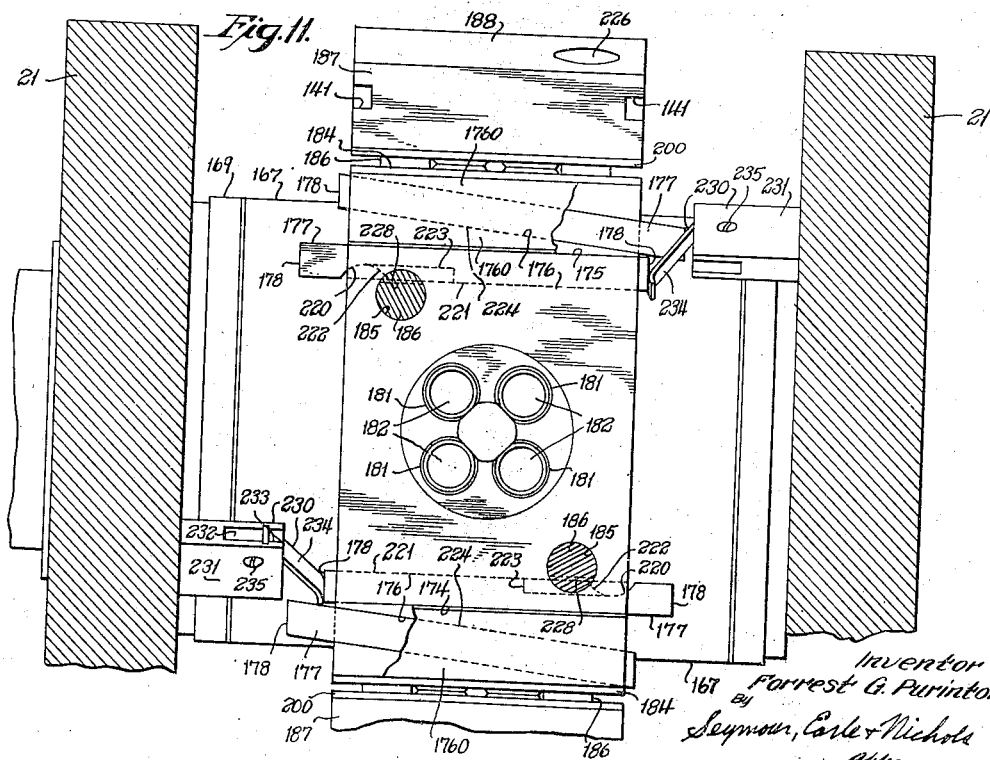
Inventor
Forrest G. Purinton
by Seymour, Carle & Nichols
Attorneys July 12, 1949.    F. G. PURINTON    2,476,219
ROTARY TRANSFER MOLDING DEVICE
Filed Nov. 21, 1946    7 Sheets-Sheet 7
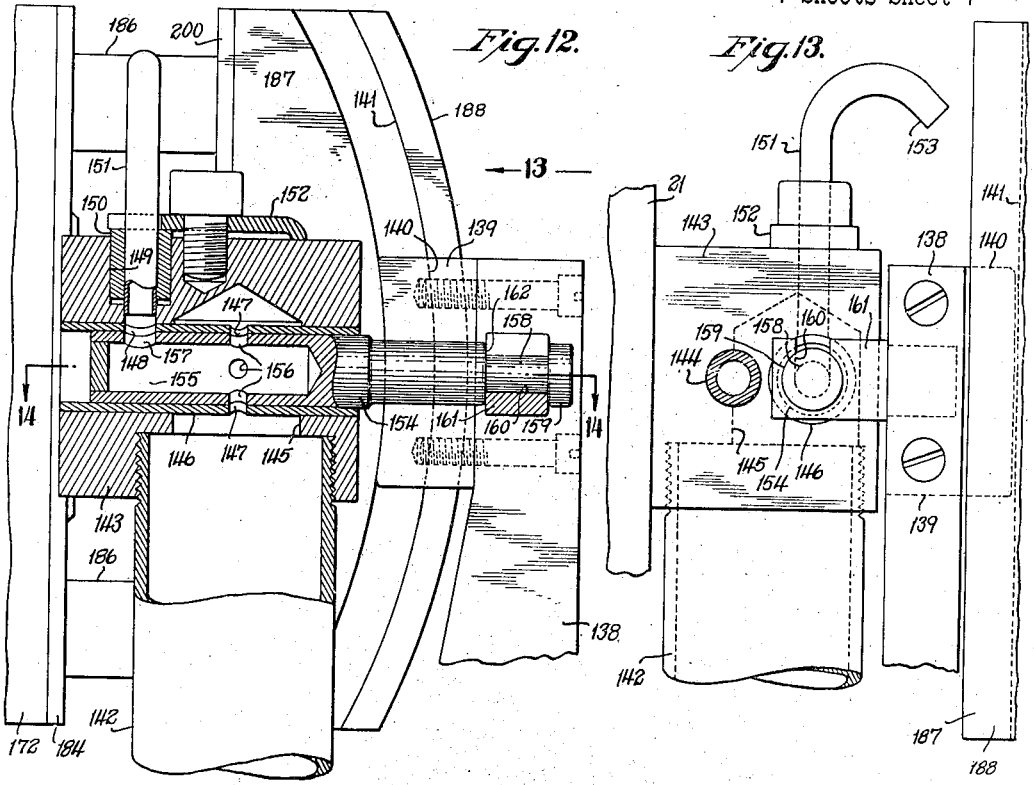
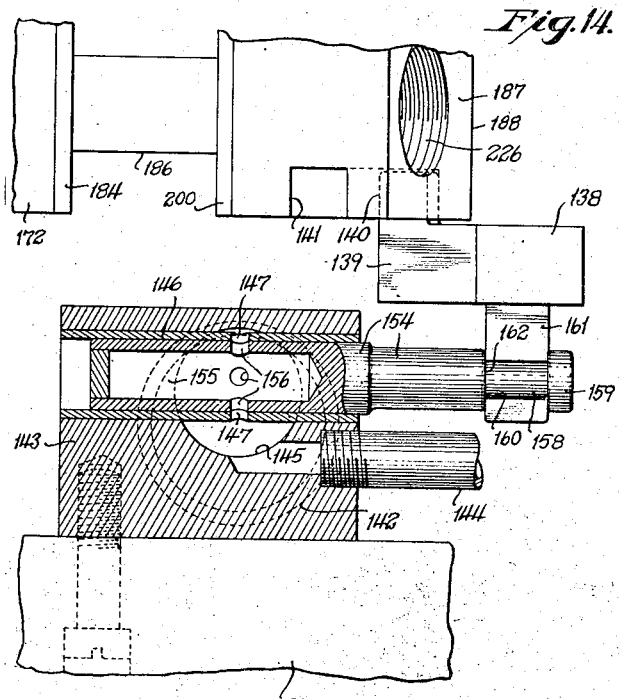
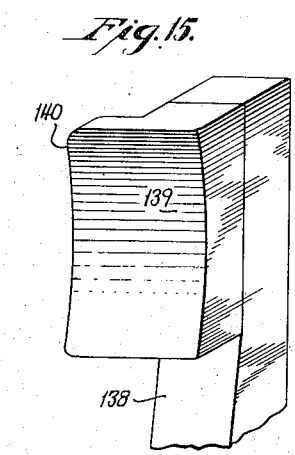
Inventor
Forrest G. Purinton
by Seymour, Earle & Nichols
Attorneys Patented July 12, 1949

2,476,219

UNITED STATES PATENT OFFICE 2,476,219

ROTARY TRANSFER MOLDING DEVICE

Forrest G. Purinton, Waterbury, Conn., assignor to The Patent Button Company, Waterbury, Conn., a corporation of Connecticut Application November 21, 1946, Serial No. 711,276

25 Claims. (Cl. 18—30)

The present invention relates in general to molding machines and more especially to an improved molding machine for molding buttons from plastic materials such as, for example, thermosetting and thermoplastic resins, the improved machine being of the radial type for sequential operation and completely automatic.

An object of the invention is to provide an improved radial-type machine for molding resinous articles.

A further object is to provide an improved radial-type transfer molding machine which is substantially fully automatic and adapted to mold articles of thermosetting resin.

A further object is to provide an improved automatic transfer molding machine capable of sequentially molding a multiplicity of articles of a thermosetting resin at a relatively-high rate of speed.

A still further object is to provide an automatic plunger-type transfer molding machine wherein the molds are mounted on the periphery of a rotatable carrier and sequentially indexed opposite a mold-charging device, the latter being mounted in fixed relation to the rotatable carrier and adapted to move radially with respect thereto, to charge the molds.

A still further object is to provide an automatic plunger-type transfer molding machine wherein the molds are closed and held under exceedingly-high compression pressure while being charged and on completion of the mold-charging operation are immediately relieved of the high-compression pressure, the pressure used to hold the molds closed during the charging operation acting independently of the pressure used to charge the molds.

It is a still further object of the invention to provide a machine in accordance with the foregoing objects wherein mold-locking means are provided which automatically lock and unlock each pair of mold-units of the respective molds as the latter are sequentially indexed through the successive operation stations.

A still further object of the invention is to provide a machine in accordance with the foregoing objects wherein the molds are automatically opened in sequence and a molded article ejected therefrom, suitable means being actuated to clean the mold-cavities prior to closing and locking the molds.

It is a still further object of the invention to provide a machine in accordance with the foregoing objects wherein the molding-pins of the molds are arranged to be sequentially thrust into the mold-cavities intermediate the mold-charging station and ejection-station.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 4 is a sectional elevation of the machine on line 4—4 of Fig. 1 showing the cooperative relationship of the reciprocable mold-unit charging-means and the mold-unit compressing-member;

Fig. 5 is a sectional plan view of a portion of the machine on line 5—5 of Fig. 1, showing the reciprocable carriage-structure for opening the mold-units and actuating the molding-pins thereof;

Fig. 9 is an enlarged view of one of the locking-bolts adapted to be engaged by a locking-bar for securing the respective mold-units together;

Fig. 10 is a broken end elevation partly in section of the right-hand end of the machine on line 10—10 of Fig. 3 showing the outer face of the inner mold-unit at the ejection-station and the locking-means for locking together each pair of mold-units;

Fig. 11 is a broken end elevation partly in section of the left-hand end of the machine on line 11—11 of Fig. 3 showing the mold-cavities of the inner mold-unit at the mold-charging station and the locking-means for locking together each pair of mold-units;

Fig. 12 is an enlarged broken sectional view taken on the line 12—12 of Fig. 2, the mold-unit being in its open position and including details of the air-supply means for cleaning the mold-cavities;

Fig. 13 is an end elevation in the direction of the arrow 13 of Fig. 12 showing the air-supply means;

Fig. 14 is a plan view in section of the air-supply means on line 14—14 of Fig. 12; and Fig. 15 is an enlarged fragmentary perspective view of one arm of the reciprocable-carriage showing the cam-shoes for engaging and separating the outer mold-unit from its corresponding inner mold-unit at the ejection-station.

*General description*

Figure 1:
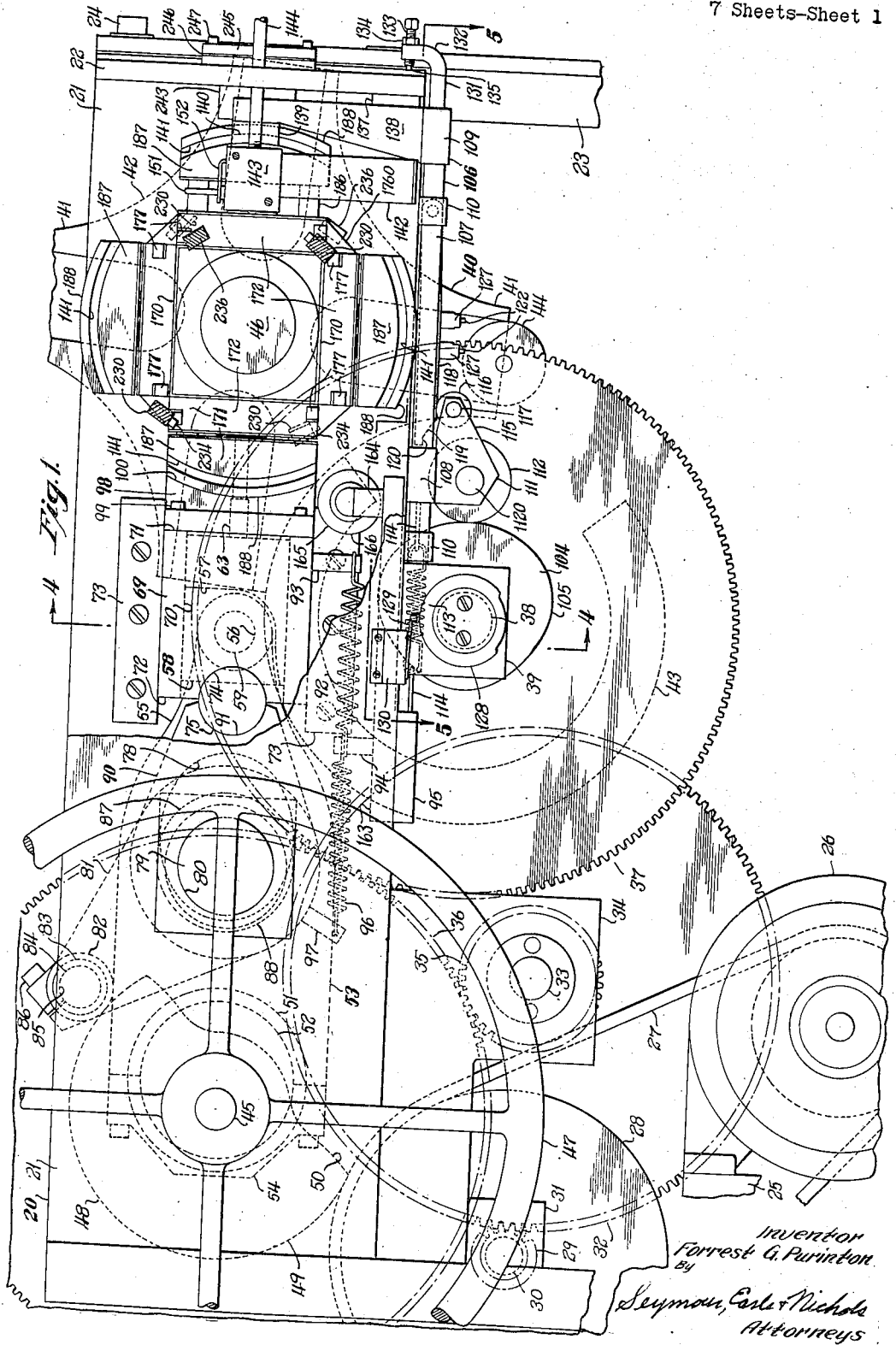
Fig. 1 is a side elevation of the improved transfer-molding machine of this invention showing the rotor and drive-mechanism therefor, the drive-mechanism at the left-hand end of the machine being partly broken away.

The molding machine which has been chosen to illustrate an embodiment of the present invention is one which is particularly adapted for forming molded articles of a thermosetting plastic material, although a thermoplastic material may be used, by the so-called "plunger" molding process, that is to say, a unit-charge of the thermosetting plastic material is fed into a charge-holding bushing of a mold and subsequently transferred in its entirety by means of a mold-charging plunger into the mold-cavity of a mold to form one or more molded articles. This is a refinement of the so-called "transfer" molding process wherein a unit-charge is fed into the transfer-pot or -chamber of a loading-plate which is independent of but cooperatively associated with the mold; and is to be distinguished from the so-called "injection" molding technique in which a charge-holding chamber is provided capable of holding a quantity of plastic material sufficient to supply several successive sets of molds before being emptied.

In general, the plunger-molding machine of this invention embodies a mold-carrying rotor rotatable in a vertical plane about a horizontal axis, and carrying four molds on its periphery at 90° intervals each comprising a pair of mold-units, the inner mold-unit being fixed to the periphery of the rotor and the outer mold-unit being movable outwardly radially with respect to the inner mold-unit. Suitable guide-means are provided, as hereinafter described, for guiding the movement of the outer mold-unit with respect to its corresponding inner mold-unit, the guide-means being also one element of suitable locking-means for locking the respective mold-units together. The outer mold-unit is provided with a charge-holding bushing or chamber, a molding-pin and an ejector, all of which have access to the mold-cavity of the outer mold-unit. The rotor is adapted to be rotated intermittently by a Geneva wheel to present the successive pairs of mold-units sequentially to the respective stations of the molding machine.

The station at which unit-charges are fed into the charge-holding bushing of each successive pair of mold-units is directly above the rotor. At an angle of substantially 90° to the feeding-station is the mold-charging station at which the mold-charging means is located, the latter comprising a reciprocable ram-like element or plunger adapted to enter the charge-holding bushing of the outer mold-unit to compress and transfer the charge therein into the mold-cavity of the mold. Associated with the mold-charging plunger is a mold-compressing member which is arranged to operate in conjunction with the mold-charging plunger to subject each pair of mold-units to a pressure of substantially 40,000 pounds immediately prior to the charging of the mold-cavity. When the charge has been transferred into the mold-cavity, suitable means are provided to actuate a molding-pin of each mold to project the molding-pin into the mold-cavity. As will be pointed out in detail hereinafter, as the mold-compressing member forces the mold-units together under the aforesaid pressure, suitable means are provided for automatically actuating the mold-locking means so as to take up any slack between each pair of mold-units. Immediately following the charging of each mold-cavity, the mold-compressing means is retracted to relieve the mold-units of the extremely-high compressing pressure.

The charged mold-units are then indexed through 90° to a re-sizing station, at which station suitable elements may be operated to again engage and project each molding-pin into its respective mold-cavity so as to re-size the aperture initially formed in the partially-cured molded article by the molding-pin.

Following the re-sizing operation, the charged mold is indexed through 90° to the ejection-station. The 180° interval between the mold-charging station and the ejection-station constitutes the curing cycle, at the end of which the thermosetting plastic within the mold-cavity has set sufficiently to permit the molded article to be ejected from the mold. At the ejection-station, a reciprocable carriage-member is adapted to engage the outer mold-unit of the mold and move it outwardly radially with respect to the inner mold-unit so as to open the mold. Concurrently, the ejector of the outer mold-unit is brought into engagement with a relatively-fixed stop which actuates the ejector to eject the molded article from the open mold. Suitable means is also provided for directing a blast of compressed air into the mold-cavity of the open mold to clean the cavity. Following ejection and cleaning, the mold is closed and locked and indexed through 90° to position it beneath the feeding-means for receiving another unit-charge, thus completing the cycle. The entire cycle consumes approximately sixteen seconds, an interval of one second being allowed between each respective station and an interval of substantially three seconds being allowed at each respective station. As in other types of molding machines, the respective mold-units may be provided with suitable heating-means for heating the mold-cavities and the charge-holding bushing of the molds. It may be desirable also to provide means for pre-heating the unit-charges prior to feeding them to the molds.

*Frame-and-drive mechanism*

Figure 2:
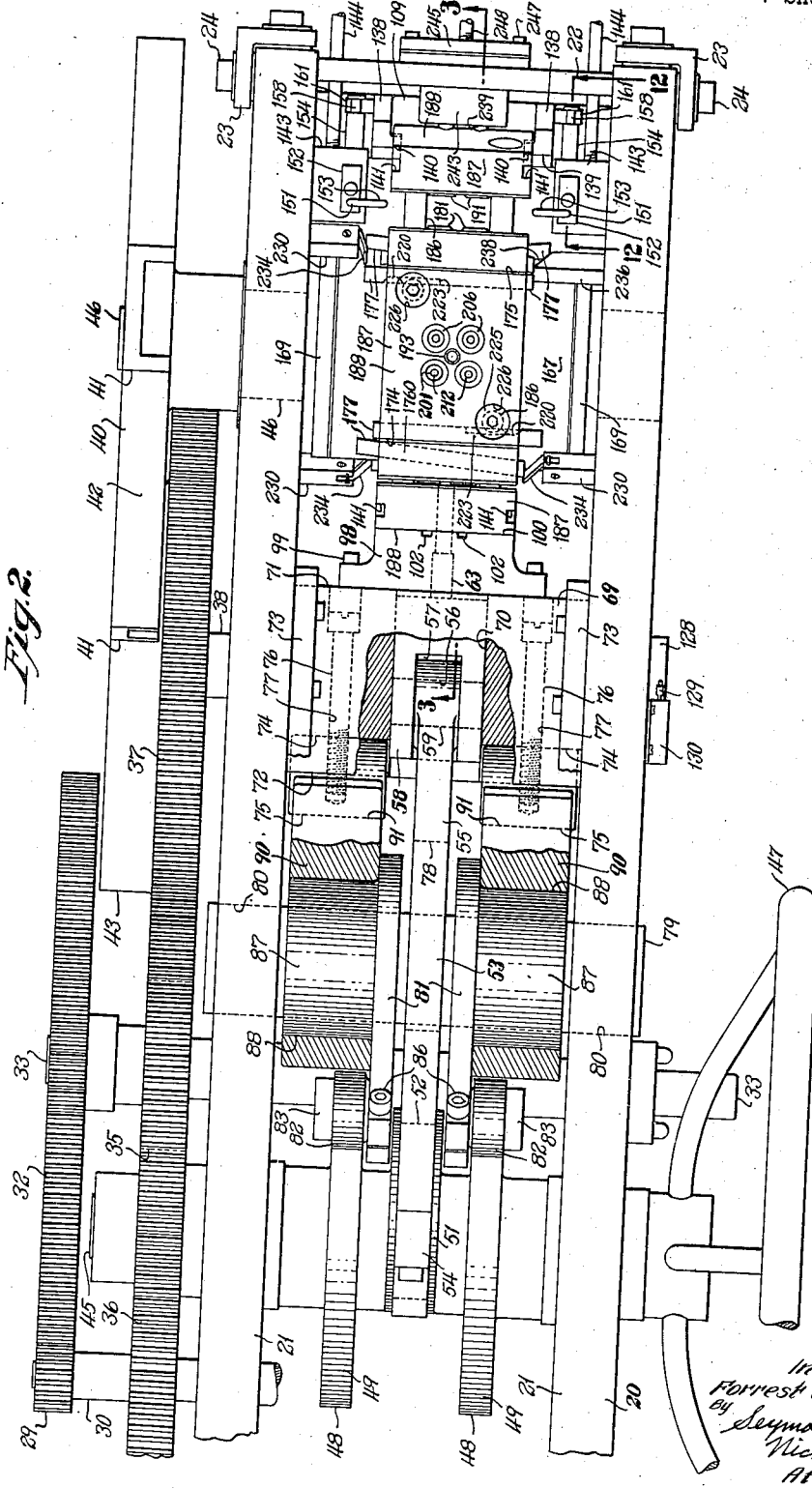
Fig. 2 is a top plan view of the machine shown in Fig. 1.

Referring now to the drawings for a more specific description of the essential elements of the machine, the frame of the molding machine is indicated generally at 20 and comprises a substantially-rectangular box-shaped structure consisting of spaced parallel side-plates 21 and end-plates 22, the latter being secured to the side-plates 21 by welded joints or equivalent fastening-means. The side-plates 21 are made from relatively-thick stock, as indicated in Fig. 2, to provide a rigid frame for supporting the mold-carrying rotor and drive-mechanism of the molding machine. Suitable legs 23 comprising angleiron stock are secured by bolts 24 or equivalent fastening-means to the four corners of the frame, the upper ends of the legs extending to the top edges of the sides and end-plates for greater rigidity.

Mounted on an adjustable bracket 25 on the underside of the frame 20 adjacent the left-hand end thereof, as seen in Fig. 1, is a power source such as, for example, an electric motor 26 which may be connected by means of a belt 27 to a pulley 28 of a gear-train comprising a pinion 29, secured to a shaft 30 which is journaled at its opposite ends in suitable bearings 31 on the lower edges of the frame and at substantially right angles to the longitudinal axis thereof, the pinion 29 being adapted to mesh with a gear-wheel 32 which is carried on a shaft 33. The latter is journaled at its opposite ends in suitable bearings 34 secured to the lower edges of the frame at opposite sides thereof respectively and carries a pinion 35 adapted to engage the teeth of a gear-wheel 36, the teeth of the latter being adapted, in turn, to mesh with the teeth of a gear-wheel 37, the gear-ratio of the gear-wheels 36 and 37 being 1:1. The gear-wheel 37 is carried on a transverse-shaft 38 journaled at its opposite ends in bearing-blocks 39 which are secured to the lower edges of the respective side-plates 21 and constitutes the drive-wheel of a Geneva stop-mechanism comprising a wheel 40 having four longitudinally-slotted arms 41 arranged in right-angle relationship and connected by arcuate fillets 42. To accomplish the intermittent step-by-step rotation of the Geneva wheel 40, the gear-wheel 37 is provided on its outer face with a concentric ring-shaped flange 43 of substantially 270° adapted to sequentially engage the fillets 42 of the Geneva stop in a well-known manner for temporarily locking the latter in fixed position following rotation of the Geneva stop-wheel 40 through successive arcs of 90°, the intermittent rotation of the Geneva stop-wheel 40 being effected by means of a roller 44 rotatably mounted against the outer face of the wheel 37 adjacent the periphery thereof, as shown in Fig. 1, and adapted to successively engage in the slotted arms 41 of the Geneva stop-wheel 40. Since the gear-train and Geneva stop-mechanism are conventional, a more detailed description of these elements may be omitted, it being sufficient to state that the gear-ratio of the above-described gear-train is such that the Geneva stop-wheel 40 rotates intermittently at the rate of one complete revolution in substantially sixteen seconds. Although not shown, any well-known means may be provided for elevating and lowering the adjustable motor-bracket 25 so as to tighten or loosen the belt 27 on the pulley 28 for changing the intermittent speed of rotation of the Geneva stop-wheel.

The gear-wheel 36 and the Geneva stop-wheel 40 are mounted on shafts 45 and 46 respectively which extend transversely of the frame and are journaled at their opposite ends in suitable bearings mounted in the side-plates 21 of the frame, the shafts 45 and 46 being in a horizontal plane substantially parallel to the horizontal plane of the frame and substantially midway between the upper and lower edges of its sides. Suitable collars are provided on opposite ends of each shaft to prevent displacement thereof in the direction of its longitudinal axis.

Figure 3:
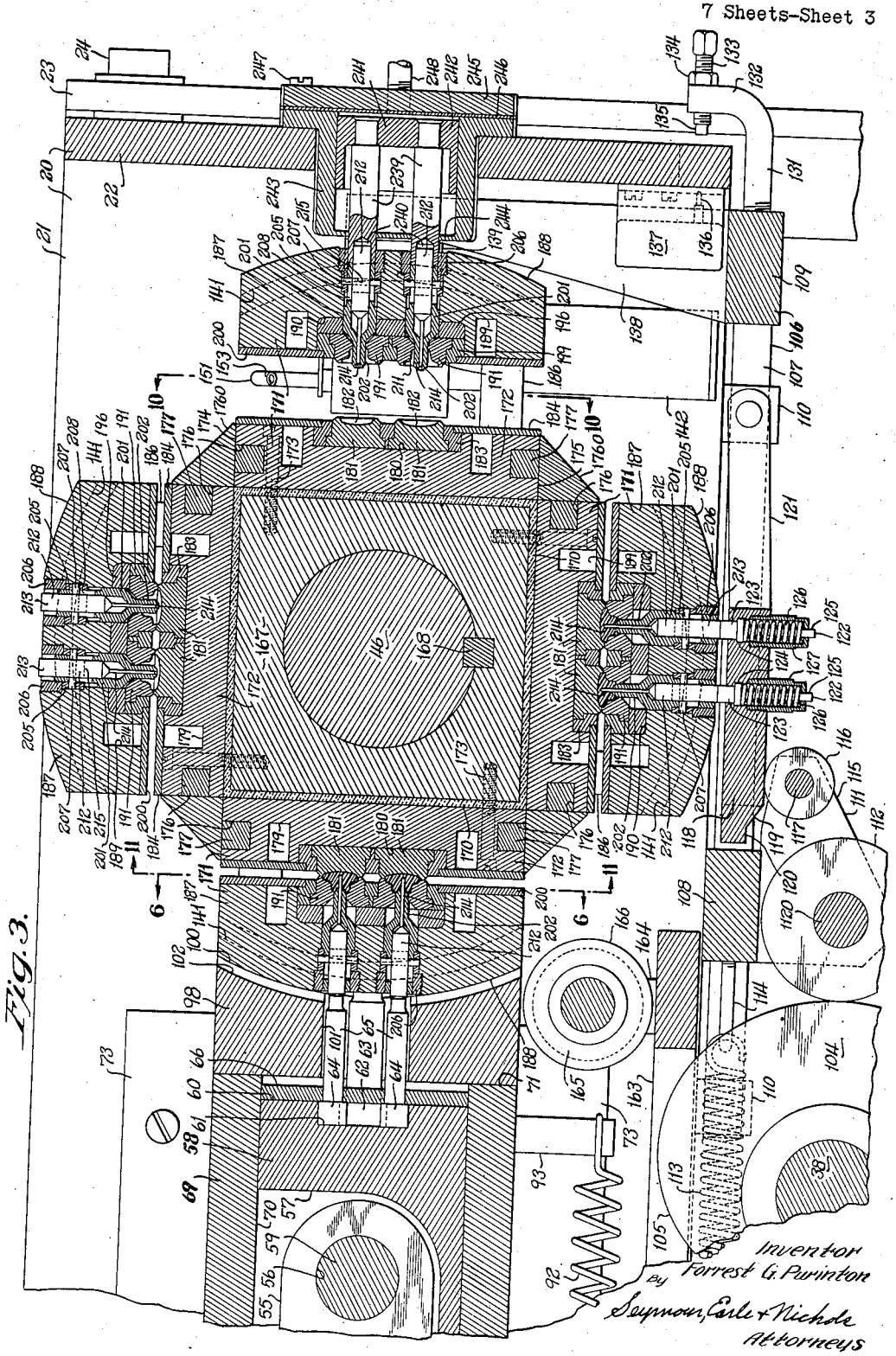
Fig. 3 is an enlarged side elevation in section of the rotor including the mold-units and mold-unit charging-means on line 3—3 of Fig. 2.
Figure 6:
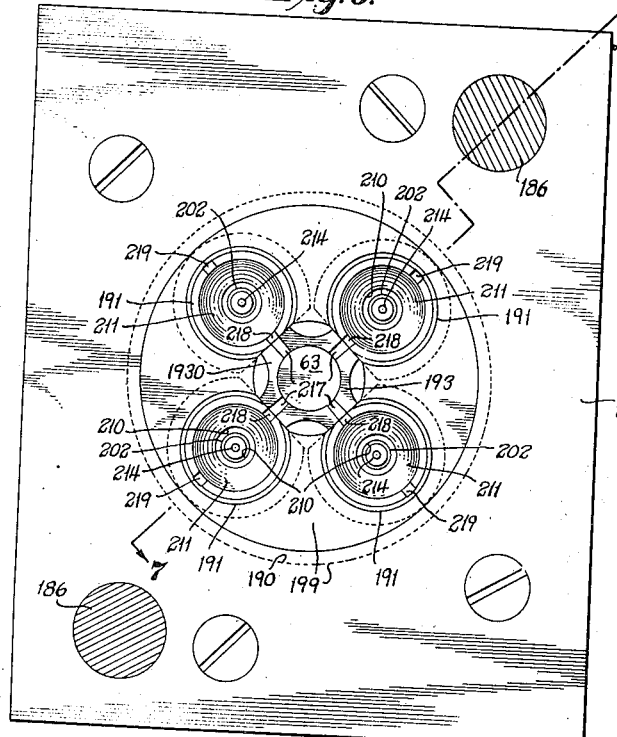
Fig. 6 is an enlarged elevation partly in section on line 6—6 of Fig. 3 showing the inner face of the outer mold-unit of a mold, the inner face having four mold-cavities connected by gates to a common mold-charging aperture.
Figure 7:
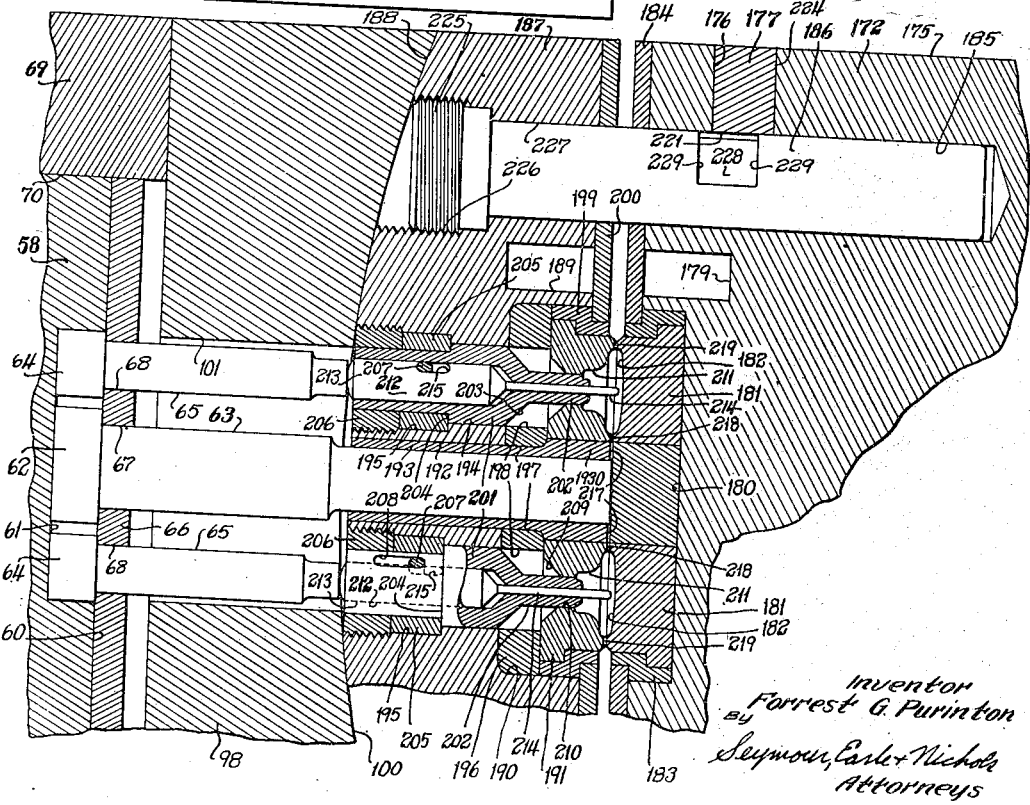
Fig. 7 is an enlarged sectional view of the outer mold-unit of a mold on the diagonal sectional line 7—7 of Fig. 6, the mold-unit compressing-means and molding-pin operating-means being shown in cooperative engagement with the outer mold-unit and the molding-pins respectively.

As seen in Fig. 2, the opposite ends of the shaft 45 extend outside of the respective side-plates 21 of the frame, the gear-wheel 36 being secured to the one outer end thereof, and a hand-wheel 47 being secured to its opposite outer end, the hand-wheel 47 being provided for manually rotating the shaft 45. Between the side-plates 21 of the frame and secured in spaced parallel relationship to the shaft 45 are a pair of cam-disks 48 each comprising a concentric lobe 49 of substantially 212° and an anti-lobe 50 of substantially 148°. The cam-disks 48 are adapted to operate the mold-compressing means hereinafter described. Secured to the shaft 45 between the cam-disks 48 is a third cam-disk 51, the cam-disk 51 having an eccentric lobe 52 adapted to actuate the mold-charging plunger hereinafter described. To this end, a connecting-rod 53 is provided having a cam-strap 54 at its rear end adapted to rotatably embrace the eccentric lobe 52 of the cam-disk 51 in a well-known manner, so that as the shaft 45 and cam-disk 51 rotate, the connecting-rod 53 is reciprocated longitudinally in the frame of the machine. The eccentricity of the cam-lobe 52 is substantially $2\frac{3}{16}''$ for providing a mold-charging stroke of the same length. As seen in Fig. 2, the connecting-rod member 53 is located substantially parallel to the longitudinal axis of the machine and comprises a substantially-rectangular relatively-wide plate disposed on edge, i. e., in a substantially-vertical plane, its forward end being reduced in width to form an attenuated neck-portion 55 which terminates at its forward extremity in a transverse bearing 56. The latter is adapted to be received in a substantially-vertical slot 57 formed at the rear end of a reciprocable crosshead 58 of substantially-rectangular cross section, the slot 57 intersecting the upper side and rear ends respectively thereof. A suitable wrist-pin 59 is provided for securing the bearing 56 of the connecting-rod in the slot 57 of the reciprocable crosshead 58. Referring to Figs. 3 and 7, the forward end or face 60 of the reciprocable crosshead 58 is provided with a circular recess 61 concentric with respect to the longitudinal axis of the block 58. The recess 61 is adapted to accommodate the flanged head 62 of the mold-charging means or plunger indicated at 63 and the flanged heads 64 of four substantially-rigid pusher-pins indicated at 65, the latter being adapted to cooperatively engage the rear ends of the molding-pins, in the manner and for the purpose hereinafter described. The heads 64 of the pusher-pins are positioned in substantially-equally-spaced relationship about the head 62 of the mold-charging plunger 63, the head of which is at substantially the center of the recess 61. The heads of the pusher-pins and charging-plunger are adapted to be held in the recess 61 in properly-spaced relationship by means of a retaining-plate 66 which, as shown, is secured by countersunk bolts to the face 60 of the reciprocable crosshead 58, the plate 66 being provided with suitably-spaced guide-apertures 67 and 68 for accommodating and guiding the shank-portions of the mold-charging plunger 63 and the pusher-rods 65 respectively.

Referring to Figs. 1, 2 and 3, the crosshead 58 is carried by a ram 69 comprising a substantially-rectangular relatively-heavy block-member which is substantially equal in width to the distance between the inside faces of the sides 21 of the frame and is supported to reciprocate longitudinally between the sides 21 by means of spaced parallel ways 73 bolted or otherwise secured to the inside faces of the side 21, the ram having a substantially-rectangular aperture 70 therein which extends longitudinally therethrough and intersects both the front face 71 and rear face 72 thereof, the crosshead 53 being slidably mounted therein.

Extending transversely across the slotted rear end 72 of the ram 69 on opposite sides of the aperture 70 thereof, is a pair of semicylindrical recesses 74 each of which is adapted to accommodate a trunnion 75 substantially equal in length to the width of its respective end-portion 72 of the ram 69. The respective trunnions 75 are adapted to be secured in their respective recesses 74 by means of fastening-means each comprising a bolt 76 extending from the front face 71 of the crosshead rearwardly through a counterbored aperture 77, the rear end of each bolt being threadedly engaged in an aperture of its respective trunnion 75.

Referring again to the connecting-rod 53, the latter is shown provided with an elongated aperture 78 (see Fig. 1) located adjacent the forward end of the connecting-rod, the major axis of the elongated aperture 78 being coincident with the longitudinal axis thereof. The elongated aperture 78 is adapted to accommodate and provide clearance for a shaft 79 which is mounted transversely of the frame, its opposite ends being journaled in suitable bearing-apertures 80 of the side-plates 21. The longitudinal axis of the shaft 79 lies in the horizontal plane of the shafts 45 and 46 and in parallel relation to the latter. Rotatably mounted on the shaft 79 between the walls 21 of the frame and in spaced parallel relationship, is a pair of rocker-arms indicated generally at 81 spaced apart transversely and having cam-follower rolls 82 mounted at their rearwardly-extending ends, the rollers 82 being rotatably supported on studs 83, each of which extends laterally from and is eccentric to a cylindrical hub-member 84. The latter are rotatably mounted in split bearing-apertures 85 in the respective ends of the rocker-arms, each hub-member 84 being adapted to be secured in predetermined adjusted position in its split bearing-aperture 85 by a clamping-screw 86 arranged to tighten the split bearing-aperture around the hub-member 84. In accordance with this construction, the studs 83 are adapted to be rotated so as to effect an adjustment of the rollers 82 with respect to the lobes 49 of the cam-disks 48. The inner end of each rocker-arm is provided with a relatively-wide hub 87 extending laterally from one side thereof and having an eccentric axial bore to receive the corresponding end of the shaft 79 on which the hub is free to rotate. The periphery of each hub 87 thus comprises an eccentric journal 88 upon which is mounted a thrust-member 90, the latter comprising a forwardly-extending arm provided at its forward end with a substantially-semicylindrical recess 91 extending transversely across the front face of the arm. The semicylindrical recess 91 of each thrust-member 90 is adapted to cooperatively engage the rearwardly-exposed substantially-semicylindrical surface of the respective trunnions 75 of the ram 69. Suitable means are provided for holding the cooperatively-engaging surfaces of the trunnions 75 and thrust-members 90 in continuous engagement and to this end a pair of coil-springs 92 are provided, the forward end of each spring 92 being fastened to a post 93 projecting downwardly from the lower side of the ram, the posts 93 being on opposite sides of the longitudinal axis of the ram. The rear ends of the springs 92 are anchored to posts 94 which project upwardly from a transversely-extending strut 95 of the frame, as shown in Fig. 1. Referring again to the cam-follower rolls 82 of the rocker-arms 81, the former are adapted to be held in continuous engagement with the lobe 49 and anti-lobe 50 of the cam-disks 48 by means of a pair of springs 96, each of which is secured at its rear end to a pin 97 projecting radially from the underside of its respective rocker-arm 81, the forward ends of the springs 96 being anchored to the aforementioned posts 94, as shown in Fig. 1.

From the foregoing description it will be clear that when the shaft 45 is rotated, the cam-disks 48 rotate and by continuous engagement of the cam-follower rollers 82 of the rocker-arms 81 with the cam-disks 48, the rocker-arms 81 are oscillated about the shaft 79, the angular displacement of the rocker-arms being substantially 30°. The oscillation of the rocker-arms 81 imparts oscillatory movement to the eccentric journals 88 of the thrust-members 90, as a consequence of which the latter are given a short reciprocating stroke longitudinally of the frame. The actual length of the stroke of the thrust-members 90 is relatively small, being of the order of $\frac{1}{32}''$. It will be noted that for each revolution of the shaft 45, the thrust-members 90 are moved forwardly positively and held in their forward positions throughout a dwell-period corresponding to the rotation of the shaft through an angle of substantially 270° and thereafter the thrust-members are positively retracted for a dwell-period corresponding to the rotation of the shaft through an angle of 90°. In the present embodiment, the duration in seconds of the forward dwell-period equals substantially three seconds, and that of the retracted dwell-period substantially one second, the speed of rotation of the shaft 45 being substantially 15 R. P. M. The forward thrust of the thrust-members 90 is positive, and due to the ruggedness of the construction and the mechanical advantage gained through the ratio of the length of the rocker-arms 81 to the eccentricity of the journals 88, which ratio is substantially 28/1, the thrust-members 90 are capable of exerting a pressure of substantially 40,000 pounds, for the purpose hereinafter described. Secured to the front face 71 of the ram 69 is a mold-compressing shoe, indicated generally at 98, comprising a substantially-solid rectangular block of metal secured by bolts 99 to the front face of the ram. As shown in Fig. 1, the shoe 98 has an arcuate face 100 comprising a cylindrical surface of revolution which conforms in curvature to the outer cylindrical surface of revolution of the outer mold-unit of each mold, as hereinafter described. The mold-compressing shoe 98 is provided with an axial aperture 101 which is substantially circular in shape and symmetrical with respect to the longitudinal axis of the ram. The aperture 101 is adapted to receive the mold-charging plunger 63 and the pusher-pins 65, the diameter of the aperture 101 being slightly greater than a cylindrical surface of revolution defined by the outside dimensions of the cluster of pusher-pins 65. As shown in Figs. 2 and 7, the arcuate face 100 of the mold-compressing shoe 98 is provided with two spaced parallel grooves 102 which extend vertically from the top of the shoe to the bottom thereof and constitute relief-recesses for accommodating the rear ends of the molding-pins of the molds. Thus, in the event any one of the molding-pins should inadvertently stick in its retracted or outwardly-projecting position, then as the molding-pins were indexed to the mold-charging station, the outer ends of the retracted molding-pins would extend into the spaced parallel grooves 102 in the face of the compressing-shoe 98, thus precluding any damage to the molding-pins.

Referring again to Figs. 3 and 5, the gear-wheel 37 is mounted at one end of the shaft 38 which, as pointed out above, extend transversely of the frame and is journaled adjacent its opposite ends in suitable bearing-plates 39 depending from the lower edge of the frame, as shown in Fig. 4. Suitable collars 103 are secured to the shaft 38 in abutting relationship with the inner faces of the depending bearing-plates 39 to prevent lateral displacement of the shaft 38. The shaft 38 is adapted to drive suitable carriage-means for opening and closing the molds and for actuating the molding-pins, as hereinafter described. To this end a cam-disk 104 is secured to the shaft 38 at substantially the center thereof and has an annular cam-surface 105 for engaging and actuating the carriage-means. Referring to Fig. 5, the carriage-means is indicated generally at 106 and is mounted between the sides 21 of the frame in a horizontal plane below the lower edges thereof and adjacent its forward end. The carriage-means 106 is fabricated of guide-rods 107 secured in spaced parallel relationship by transverse tie-bars 108 and 109, the opposite ends of which are secured to the opposite ends respectively of the guide-rods 107. The latter are supported for reciprocable movement in a substantially-horizontal plane by two pairs of brackets 110, each pair projecting inwardly from opposite sides 21 of the frame and having cylindrical apertures at their free ends to slidably receive the respective ends of the guide-rods 107. Referring to Fig. 3, supported on the underside of the transverse tie-bar 108 of the carriage-means 106 by two spaced parallel flanges 111 depending therefrom is a cam-follower roller 112 rotatably mounted on a transverse shaft 1120 which is journaled at its opposite ends in suitable bearing-apertures of the depending flanges 111. The cam-follower roller 112 is adapted to be held in continual engagement with the cam-surface 105 of the cam-disk 104 by means of the restraining force of a pair of coil-springs 113, the forward ends of which are secured to the transverse tie-bar 108 of the carriage-means by suitable hooks 114. The rear ends of the springs 113 are anchored by similar hooks 114 to the fixed transverse-strut 95 of the frame. As the cam-disk 104 is rotated, the lobe of the cam-surface 105 engaging the cam-follower roller 112 will force the carriage-means 106 forwardly in the frame, i. e., to the right, as seen in Fig. 3, the carriage being returned to its normal position by the force of the tensioned springs 113 as the roller 112 engages the anti-lobe portion of the cam-surface 105.

Each of the spaced parallel flanges 111 is provided with a forwardly-extending reach 115 between which a roller 116 is mounted on a transverse-shaft 117. Referring to Figs. 3 and 5, the roller 116 is adapted to engage the underside of a hinged-plate 118 which is substantially-rectangular and provided at its rear end with an upwardly-beveled ramp 119 terminating in a flat 120. The opposite end of the plate 118 is hinged to the frame by a pair of forked arms 121, the forward ends of which are pivotally secured in any suitable manner to the fixed brackets 110 of the frame, the pivotal connections between the arms 121 and the fixed brackets 110 being inside of the spaced parallel guide-rods 107 of the carriage-means. As shown in Figs. 1 and 3, the reciprocable carriage-means 106 is in its forward position having been moved forwardly by engagement of the lobe of the cam-surface 105 with the roller 112 of the carriage. In its advanced position, the roller 116 of the carriage is adapted to engage the underside of the hinged-plate 118 to positively force the latter up into a substantially-horizontal position, for the purpose hereinafter described. As the carriage is drawn rearwardly by the force of the springs 113, as described above, the carriage-roller 116 will be moved to the left, as seen in Figs. 1 and 3, and withdrawn from the underside of the hinged-plate 118 first to a position substantially opposite the beveled-ramp 119, as a consequence of which the hinged-plate 118 is allowed to swing downwardly, and thereafter to its rearmost position substantially opposite the flat 120 of the ramp, in which position the carriage-roller serves to support the rear end of the hinged-plate. As the carriage and carriage-roller are returned to their advanced positions by the rotating cam-disk 104, the carriage-roller 116 rides down the ramp 119 of the hinged-plate 118 onto the underside thereof, to again elevate it to its substantially-horizontal position.

The reciprocable motion of the carriage 106 is not uniform but enjoys a dwell-period in its advanced position of substantially one second duration, which is effected by the lobe-portion of the cam-surface 105 of the cam-disk 104, the lobe-portion having an eccentricity of substantially one inch and an angular measure of substantially 90°. The carriage is returned to its normal position and again advanced by the anti-lobe portion of the cam-surface 105, the length of each stroke of the carriage being substantially one inch, and the total duration of the return and advance strokes being substantially three seconds.

Referring to Fig. 3, mounted in the hinged-plate 118 adjacent the forward edge thereof, are a plurality of spring-mounted pusher-pins 122 of identical construction each comprising a cylindrical head 123 having a flange 124 at its base and a downwardly-projecting shank-portion 125. A coil-spring 126 is adapted to surround the shank 125 of each pusher-pin and to abut at its upper end against the flange 124 thereof, the lower end of the spring 126 being seated in the bottom of a cup-shaped thimble 127 threadedly secured at its upper end in an aperture in the plate 118. The bottom of each cup-shaped thimble 127 is provided with an axial aperture to accommodate the lower end of the shank 125. The spring-mounted pusher-pins 122 are grouped together in spaced relationship corresponding to the grouping of the rigid pusher-pins 65 and in operation are adapted to engage the rear ends of the respective molding-pins of the molds, when the latter are indexed opposite the re-sizing station, to re-enter the molding-pins into the apertures of the partially-cured buttons for re-sizing the apertures. The spring-mounted pusher-pins 122 are normally out of contact with the molds but as the carriage 106 moves forwardly, the hinged-plate 118, in which the pusher-pins 122 are mounted, will be swung upwardly, as described above, so as to move the pusher-pins against the rear ends of the molding-pins of each successive mold.

Suitable control-means are provided for automatically controlling the operation of the machine and as shown at 128, comprises a contactcam-plate secured to the outer end of the shaft 38 and adapted to be engaged by the roller of the arm 129 of a micro-switch 130 which is secured to the adjacent side 21 of the frame. Acting in conjunction with the above-described control-means, is a second control-device which, as shown in Figs. 3 and 5, comprises an arm 131 secured to the transverse tie-bar 109 of the carriage, substantially at the center of the bar and projecting forwardly therefrom, the arm being bent-up at substantially right angles as at 132, at the upper end of which is a threaded aperture for receiving an adjustable-screw 133 provided with a lock-nut 134. The inner end 135 of the screw 133 is adapted to be in substantially-axial alignment with the button 136 of a micro-switch 137 secured to the end-plate 22 of the frame.

The control-means are so arranged as to automatically stop the machine in the event foreign matter or a molded article is retained in a mold-cavity at the ejection-station, the inclusion of which would seriously damage the molds when the latter were closed and indexed through the molding cycle. Consequently, the control-devices of the micro-switch 130 and the micro-switch 137 are part of a circuit so arranged that when the carriage 106 is in its normal rearward position, the micro-switch 130 is opened but the switch 137 is closed, as a consequence of which the machine is kept in continuous operation. When the carriage is moving forwardly, away from its normal position, the micro-switch 137 is open, but during this time the micro-switch 130 is adapted to be closed and hence the operation of the machine is uninterrupted. However, if on the return stroke of the carriage it is unable to arrive at its normal retracted position, due to the inclusion of foreign material in the mold-cavities, then the micro-switch 137 will be open at the time the micro-switch 130 is opened by the rotating contact-cam 128, thereby stopping the operation of the machine.

Referring to Figs. 5, 12, 14 and 15, the carriage-means 106 is provided at its forward end and at opposite sides thereof with a pair of upstanding substantially-vertical arms 138 at the upper end of which are suitable cam-shoes 139 respectively. Each cam-shoe 139 is provided with an inwardly-projecting lip 140 which comprises a cylindrical surface of revolution adapted to slidingly engage in an arcuate groove 141 in the adjacent edge of the outer mold-unit of each mold for opening and closing the respective molds, as hereinafter described.

Suitable means are provided at the ejection-station of the machine (see Fig. 3) for cleaning the mold-cavities of the separated molds. Referring again to Figs. 12, 13 and 14, the mold-cavity cleaning-means comprises a pair of air-storage tanks 142, each of which is threadedly secured at its upper end in a threaded aperture in the bottom of a manifold-block 143 suitably fastened to the inside wall of the adjacent side 21 of the frame, the air-tanks being spaced apart laterally sufficiently to permit the vertical upstanding arms 138 of the carriage to pass therebetween. Each air-tank 142 is supplied with air by a line-supply pipe 144 connected to each tank. The upper open end of each tank 142 intersects the lower end of a cylindrical-bore 145 projecting upwardly substantially vertically in its respective manifold-block 143 from the threaded aperture in the bottom thereof, the upper end of each cylindrical-bore being closed. Mounted securely in each manifold-block 143 substantially parallel to the longitudinal axis of the frame and at right angles to the longitudinal axes of its respective tank 142 and cylindrical-bore 145, is a hollow cylinder 146, the longitudinal axis of which intersects the longitudinal axis of its respective cylindrical-bore 145, as shown in Fig. 13. The wall of each cylinder 146 is provided with a plurality of radial apertures 147 around its circumference substantially intermediate the opposite ends of the cylinder. A single radially-extending aperture 148 is provided adjacent the rear end of each cylinder in its upper side. The apertures 148 of the cylinders intersect and are in axial alignment with counterbored apertures 149 in the tops of the respective manifold-blocks 143, in which are mounted bushings 150 adapted to support the lower ends of tubes 151 opposite the apertures 148 of the cylinders. Each bushing 150 is provided with fastening-means comprising a bracket 152 by which the bushing 150 is adapted to be secured in its counterbored aperture 149. The upper end of each tube 150 is provided with a gooseneck 153, the extremity of which is adapted to lie substantially opposite the mold-cavities when the molds are open.

Slidably mounted within each cylinder 146 is a sleeve-valve member 154 comprising a cylinder-member having an air-chamber 155 at one end provided with a plurality of radial apertures 156 adapted to register with the radial apertures 147 of its respective cylinder 146 and an aperture 157 adjacent its left-hand end, as seen in Figs. 12 and 14, adapted to register with the corresponding aperture 148 of its cylinder 146. Each sleeve-valve 154 is provided at its right-hand end with a shank-portion 158 of reduced diameter having an enlarged head 159. As shown in Figs. 12 and 13, the shank-portion 158 of each sleeve-valve is adapted to engage in a U-shaped slot 160 of a bracket 161 secured to and extending laterally from the adjacent upright arm 138 of the carriage 106, the head 159 and shoulder 162 of the reduced shank 158 engaging on opposite sides of the bracket 161, as a consequence of which reciprocating movement of the carriage 106 imparts longitudinal reciprocating movement to the sleeve-valve 154 for moving the latter with respect to the hollow-cylinder 146, so as to bring the apertures 156 of the sleeve-valve into registration with the apertures of the cylinder 146. It will be clear that when the apertures of the sleeve-valves and cylinders are in registration, air within the tanks 142 is allowed to escape therefrom into the air-chambers 155 of the sleeve-valves and from thence through the registering-apertures 157 and 148 into the tubes 151, the latter being adapted to deliver the air streams directly into the open molds so as to clean the cavities thereof. By connecting the sleeve-valves to the carriage 106 in the manner described above, the discharge of air from the tanks is adapted to occur at the time the molds are separated by movement of the reciprocating carriage.

Referring again to Fig. 5, secured at one end by bolts or other fastening-means to the transverse-strut 95 of the frame is a substantially-rectangular flexible arm 163 having a clearance-slot to provide the necessary clearance for the cam 104. The opposite end of the arm 163 is unsupported and carries a pair of bearing-blocks 164 which are suitably secured thereto and extend upwardly substantially vertically therefrom.

Mounted between the upper ends of the bearing-blocks 164 is a roller 165 (see Fig. 4), the latter being split transversely and having a spool-shaped profile to provide a pair of raised annular rims 166. The latter are adapted to engage the rear ends of the molding-pins of the molds as the molds are indexed between the mold-charging station and the re-sizing station, so as to re-enter the molding-pins into the partially-cured molded buttons for re-sizing the apertures thereof.

*Mold-carrying rotor*

The molding machine of this invention embodies mold-carrying means having four molds extending radially therefrom at equally-spaced intervals around the periphery thereof. Referring to Figs. 2 and 3, the mold-carrying means comprises a sleeve 167 which is substantially square in cross section and apertured longitudinally to make a nice fit on the hub-portion of the shaft 46. A longitudinal key 168 is provided for securing the sleeve to the shaft. The opposite ends of the sleeve are adapted to abut suitable end-thrust bearings 169 supported on corresponding ends of the shaft 46 to prevent lateral displacement of the sleeve. Each of the four planar faces of the sleeve provides a mounting-surface for one of the molds, the respective mounting-surfaces of the sleeve being provided with a sheet of a suitable heat-insulation material, as indicated at 170.

The molds are indicated generally at 171 and since each of the four molds are identical in construction, for the sake of brevity the following description will relate to one mold only. Each mold comprises two separable plates adapted to support the individual die-blocks which embody the mold-cavities, these plates being hereinafter referred to as "mold-units." The inner mold-unit is indicated at 172 and comprises a substantially-rectangular block of metal, the dimensions of its base being substantially equal to the dimensions of the corresponding face of the sleeve 167, to which the inner mold-unit is secured by suitable fastening-means such as, for example, by bolts 173, the heads of which may be countersunk in the outer face of the inner mold-unit. Extending longitudinally throughout the length of the sides 174 and 175 respectively of the inner mold-unit are open grooves 176 substantially rectangular in cross section, the longitudinal axes of which extend substantially diagonally from one end to the opposite end of the respective sides 174 and 175 of the inner mold-unit, as shown in Figs. 10 and 11, the slope of the diagonal open groove in the one face 174 being opposite to the slope of the diagonal open groove in the face 175. Each groove is adapted to receive a locking-member 177 adapted to lock the inner mold-unit to its respective outer mold-unit, as hereinafter described. Each locking-member comprises a longitudinal bar 177 of hard metal substantially rectangular in cross section and dimensioned to make a smooth sliding fit in its respective open groove 176, the over-all length of each bar being somewhat greater than the width of the inner mold-unit 172, so that opposite ends of the bar will extend beyond the corresponding ends of the respective inner mold-units. Each end of each bar is provided with a beveled cam-surface 178, the slope of the bevel at one end of the bar being in the direction of the slope at the opposite end of the bar. As shown in Fig. 3, the locking-bars 177 of each inner mold-unit are held in their respective grooves 176 by means of suitable prismatic blocks 1760 of triangular cross section, the right-angle faces of which are adapted to abut the complementary grooved sides of each successive pair of inner mold-units, the prismatic blocks 1760 being secured to the respective complementary sides of the inner mold-units by suitable fastening-means. Formed in the outer face of each inner mold-unit 172 is a channel 179 having the form of an annulus symmetrically located with respect to the center of the outer face of the inner mold-unit. This annular channel 179 is adapted to accommodate heating-means (not shown) which may be electric heating-coils or other conventional heating-means for heating the inner mold-unit. Within the encompassment of the annular channel 179 is a relatively-shallow circular recess 180 adapted to support a set of four die-blocks 181 embodying the mold-cavities 182. The die-blocks are substantially-cylindrical members having annular flanges at their bases, the die-blocks being held in a symmetrically-arranged cluster within the recess 180 by a spider 183 adapted to engage the annular flanges of the die-blocks. The spider 183 is, in turn, secured in the recess 180 in the front face of the inner mold-unit 172 by means of a rectangular retaining-plate 184, the latter being secured to the outer face of the inner mold-unit by screws or similar fastening-means (not shown). In two diagonally-opposite corners of each inner mold-unit are smooth-bored guide-holes 185, each hole being adapted to slidably receive the lower end of the shank of a locking-bolt 186 for securing the outer and inner mold-units together in separable relationship, the bolt 186 being adapted also to cooperate with the mold-unit locking bars 177 for locking the mold-units together, as hereinafter described.

Referring to Fig. 7, the outer mold-unit of each mold is indicated generally at 187, the outer face of which comprises a cylindrical surface of revolution 188, the contour of which corresponds to the contour of the arcuate surface 100 of the mold-compressing shoe 98. The inner face of the outer mold-unit 187 is, like the outer face of the inner mold-unit 172, provided with an annular channel 189 for accommodating suitable heating-means for heating the outer mold-unit; and a circular recess 190 within the encompassment of the annular channel 189 and substantially concentric with respect thereto for accommodating four die-blocks 191 which complement the four die-blocks 181 of the inner mold-unit. Intersecting the center and bottom of the recess 190 is one end of a cylindrical aperture 192 which extends through the outer mold-unit 187 and intersects at its opposite end the outer cylindrical surface 188 thereof, the aperture 192 being adapted to accommodate a mold-charging bushing or chamber 193 which is suitably secured in the aperture 192 as, for example, by a press-fit and provided with an enlarged head 1930 which extends into the recess 190, as shown in Fig. 7. Arranged substantially symmetrically about the aperture 192 are four additional cylindrical apertures 194 each of which constitutes a counter-bore-portion 195 at one end intersecting the cylindrical surface 188 of the outer mold-unit, the opposite end of each aperture intersecting the bottom of the recess 190.

Seated in the bottom of the recess is a perforated spacer-plate 196 having a central aperture 197 to accommodate the forwardly-projecting end of the charging-bushing 193; and four apertures 198 spaced symmetrically about the central aperture 197 and in axial alignment with the apertures 194 of the outer mold-unit. The die-blocks 191 are seated on the perforated spacer-plate 196 and held in engagement therewith and in axial alignment with the apertures 198 thereof by means of a spider 199, the latter having a central aperture to receive the enlarged head 193a of the charging-bushing 193 and being, in turn, held within the recess 190 of the outer mold-unit 187 by a retaining-plate 200 secured by any suitable means to the inner face thereof. The counterbored apertures 194 are adapted to constitute bearing-apertures for guiding the article-ejector members 201 which are slidably mounted therein, there being one ejector for each die-block 191. Each ejector-member 201 comprises a substantially-cylindrical sleeve provided at its inner end with a hollow elongated nose-portion 202 of reduced diameter hereinafter termed the "ejector-pin," the latter being joined integrally with the body of the sleeve by a conical shoulder 203. The outer end of each cylindrical ejector-sleeve is reduced in diameter to provide a substantially-annular square shoulder 204 adapted to abut against the square shoulder of a retaining-ring 205. The latter are seated in the bottoms of the counterbores 195 of the apertures 194 in the outer mold-unit, and are held therein by locking-rings 206 which are threadedly secured in the outer ends of the counterbores 195. The cylindrical ejector-sleeves are thus held positively from moving outwardly radially but are free to slide inwardly. The permissible inward displacement of each ejector-member is positively limited by means of a pin 207 fixedly secured at its opposite ends in apertures of its respective retaining-ring 205 and adapted to engage in a transverse slot 208 of predetermined length formed in the respective sleeve-ejector member, the length of each slot corresponding substantially to the permissible displacement of the ejector-pin. In this connection, the rear face of each die-block 191 is provided with a countersink 209 which affords a relief-recess for the conical shoulder of the cylindrical ejector-sleeve and which is concentric with the axial aperture 210 of the die-block through which its respective hollow ejector-pin 202 is adapted to project into the mold-cavity 211 thereof. Slidably mounted within each ejector-sleeve 201 is a molding-member indicated generally at 212, each comprising a shank-portion 213 having a sliding fit in the cylindrical bore of its respective ejector-sleeve and provided at its inner end with an integral relatively-long thin pin 214 which, in turn, has a sliding fit in the apertured ejector-pin 202 of its respective ejector-sleeve. A transverse slot 215 of predetermined length is provided in the shank-portion 213 of each molding-pin, each slot being adapted to receive the respective pin 207 before referred to and which is secured in the respective retaining-rings 205. The transverse pins 207 thus permit limited longitudinal movement of the molding-pins 212 within the ejector-sleeves 201, the displacement of each pin corresponding to the length of its respective slot 215. The rear end of each molding-pin 212 is provided with a smooth rounded surface adapted to be engaged sequentially by the pusher-pins 65 and 123 which are adapted to project the molding-pins into their respective mold-cavities 211.

Referring again to the mold-charging bushing 193, the annular rim of the enlarged end 193a thereof is provided with four relatively-shallow gates 217 extending radially from the center of the bushing, each gate being adapted to connect the cylindrical bore of the charging-bushing with one of the four mold-cavities 211 of the respective die-blocks 191. In furtherance of this end, the face of each die-block is provided with a corresponding shallow radial gate 218, one end of which intersects its respective mold-cavity 211, the opposite end being adapted to be lined up with one of the gates 217 of the charging-bushing. Diametrically opposite the gate 218 of each die-block is a radial groove 219, the latter being adapted to form an extremely-shallow relief- or vent-passage for its respective mold-cavity 211. When the corresponding die-blocks of each pair of mold-units are in engagement, the gates 217 and 218 of the die-blocks 191 become closed passages, as shown in Fig. 7, adapted to feed the molding material from the bore of the charging-chamber 193 into the four respective mold-cavities 211, any excess material or vapor pressure within the mold-cavities being vented through the relief-passages 219.

Figure 8:
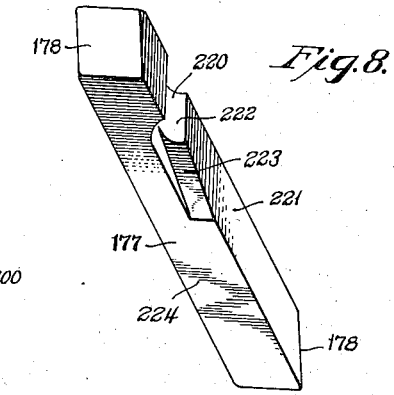
Fig. 8 is an enlarged perspective view of one of the mold-unit locking-bars.

Referring to Figs. 7, 8, 9, 10 and 11, the inner and outer mold-units of each mold are adapted normally to be locked in mutually-engaging relationship throughout a major portion of the molding cycle by suitable locking-means, the latter being adapted to be actuated automatically as the molds are sequentially positioned opposite the several operating-stations of the machine. As pointed out above, the locking-means of each pair of mold-units comprises a pair of sliding-bars 177 mounted in the inner mold-unit and adapted to be lockingly engaged with a pair of locking-bolts 186 carried by the outer mold-unit. To this end, each bar 177 is provided adjacent one end with a nearly semicylindrical clearance-recess 220 on the side 221 thereof which corresponds to that side which is adapted to engage the bottom of its respective groove 176 in the inner mold-unit, the longitudinal axis of the nearly semicylindrical recess 220 being at substantially 7° to the longitudinal axis of the face 221 of the bar. At the lower end of this nearly semicylindrical recess, its wall 222 is adapted to be intersected by a ramp 223 which is substantially one-half as wide as any one side of the bar 177 and is formed in the side 224 of the bar which is intersected by the lower end of the nearly semicylindrical recess 220, as shown in Fig. 8. The ramp 223 constitutes a planar cam-surface having a uniform pitch of substantially 7° and extends longitudinally of the bar from its point of intersection with the recess 220 to its opposite extremity which blends into the face 224 of the bar.

Each locking-bolt 186 (see Fig. 9) is provided with an enlarged head adapted to be seated in a counterbore 226 of an aperture 227 provided in the outer mold-unit in axial alignment with the corresponding smooth bored aperture 185 of the inner mold-unit and secured therein by means of an exteriorly-threaded plug 225, the shank of the bolt extending through the axially-aligned apertures 185 and 227 and having a sliding fit in the smooth bored aperture 185. Intersecting the shank of the bolt intermediate its opposite ends is a transverse slot 228 having substantially-parallel walls 229 spaced apart a distance somewhat greater than the width of a side of one of the bars 177 and perpendicular to the bottom of the slot, the depth of the slot being slightly less than one-half the diameter of the bolt 186.

When a locking-bar 177 is assembled in its respective groove 176 of the inner mold-unit, its side 221, including its semicylindrical recess 220, is adapted to cooperatively engage in the slot 228 of its respective locking-bolt 186. Referring to Fig. 10, when the semicylindrical recess 220 of each bar is substantially opposite the slot 228 of its respective locking-bolt 186, the latter is free to move through the recess 220 of the bar 177. Assuming both locking-bars 177 of a mold are in this position, which may be described as the "abnormal unlocked position" of the bars, then the outer mold-unit to which the locking-bolts 186 are secured is free to move outwardly radially with respect to the inner mold-unit, the outer mold-unit being guided by the smooth sliding fit of the shanks of the locking-bolts in the smooth bored apertures 185 of the inner mold-unit. Normally, however, the locking-bars 177 are in locking engagement with their respective bolts 186, under which circumstances the semicylindrical recesses 220 of the bars 177 are out of alignment with the locking-bolts and the corresponding sides 221 of the bars engage in the rectangular slots of the bolts. When such displacement of the bars 177 has been effected, the ramp 223 of each bar engages the adjacent wall 229 of the slot 228 in its respective bolt 186 in a camming action which positively draws the bolt inwardly radially and hence forces the outer mold-unit into tightly-locked engagement with its inner mold-unit. Moreover, this same action serves to take up any slack which may exist between the locked outer and inner mold-units when the latter are subjected to high compression pressures, as hereinafter described.

As pointed out above, the locking and unlocking of each respective pair of mold-units is accomplished automatically. To this end, suitable locking-bar actuating-members, indicated generally at 230, are provided which, as shown, are secured to the inside walls of the sides 21 of the frame and are adapted to project inwardly into the path of movement of the opposite beveled ends 178 of the respective locking-bars as the latter are sequentially indexed through the molding-cycle.

Referring to Fig. 11 which shows a view of one of the molds as seen from the vantage point of the mold-charging plunger, as each mold is indexed into its mold-charging position, the respective locking-bars 177 of the inner mold-unit are carried into engagement with a pair of locking-bar actuating-members 230. One of these members is located on the inside wall of one side of the frame substantially opposite the upper locking-bar 177, the other locking-bar actuating-member being located on the inside wall of the opposite side 21 of the frame, substantially opposite the lower locking-bar. Each locking-bar actuating-member 230 comprises a supporting-block 231 fastened in any suitable manner to the wall of the side 21 of the frame and is provided across one corner of its outer end with a U-shaped slot 232, the upwardly-extending sides of which have inwardly-projecting spaced parallel flanges 233. Mounted in the slot 232 is a resilient member 234 comprising a spring-steel leaf, one end of which is engaged in the slot beneath the inwardly-projecting flanges 233 thereof, the aforesaid end of the leaf-spring being securely held in the slot by fastening-means comprising a screw 235 extending between the sides of the slot and suitably arranged to draw the latter together, so as to pinch the end of the leaf-spring 234 therebetween. The opposite end of the leaf-spring 234 projects freely into the path of its respective locking-bar 177, the leaf-springs extending in the direction of movement of their respective locking-bars. Thus, as the locking-bars move into mold-charging position, the beveled ends 178 of the locking-bars are engaged by their respective leaf-springs 234 which exert a resilient force thereon to move the locking-bars transversely in their respective grooves. Consequently, when the outer mold-unit is subjected to the extremely-high compression pressure exerted thereon by the compressing-shoe 98, the slight inward movement of the outer mold-unit with respect to the inner mold-unit will permit the ramps of the locking-bars to move up somewhat further onto the respective walls 229 of the slots in the locking-bolts and thus to automatically take up any slack between the locking-members. After the high compression force has been removed from the mold-units, the locking-bars 177 successfully hold the outer and inner mold-units tightly compressed, but due to the inherent resiliency of the locking-bars there may be an appreciable reduction in the original high pressure exerted on the respective mold-units. However, since the mold-cavities have already been charged, this reduction in compression pressure may be tolerated.

After the molds have been indexed from the charging-station and as they are moving into the ejection-station, the respective locking-bars of each mold are adapted to be engaged again by suitable locking-bar actuating-members. At the ejection-station there are two sets of locking-bar actuating-members, one set corresponding to the resilient leaf-devices 230 used at the charging-station. Associated with the resilient leaf-spring devices 230 are a set of locking-bar actuating-members, indicated generally at 236 and comprising a pair of fixed ramp-blocks, each ramp-block comprising a base-portion 237 secured to and projecting transversely from the inside wall of one side 21 of the frame substantially opposite one of the resilient leaf-spring devices 230 on the other side of the frame, the ramp-block having a ramp 238 adapted to extend into the path of movement of the locking-bars 177. Each ramp-block 236 is placed slightly lower on its respective side of the frame than its corresponding resilient leaf-spring device 230, as a consequence of which the outwardly-projecting beveled ends 178 of the locking-bars 177 are engaged first with the ramps 238 of the fixed ramp-blocks, which action positively compels each respective locking-bar to move transversely in its respective groove out of locking engagement with its respective locking-bolt. However, while one end of each locking-bar is still in engagement with its respective ramp, the opposite end of each bar has been moved into engagement with its respective resilient leaf-spring device 230. While the locking-bars are so held, the unlocked outer mold-unit is adapted to be moved outwardly with respect to the inner mold-unit by means of the reciprocable carriage 106 to open the mold and effect ejection of the molded buttons, after which the outer mold-unit is positively moved inwardly to close the mold. Thereafter, as the indexing movement of the mold is initiated, the ends of its locking-bars, which have been in engagement with the ramps 238, are moved off thereof, whereupon the resilient leaf-springs 234 immediately move the locking-bars into locking engagement with their respective locking-bolts, thus locking the outer and inner mold-units together before the centrifugal force created by rotation of the mold has had an opportunity to separate the mold-units. The mold-units are thus locked together as they are sequentially indexed to the feeding-station and charging-station.

Turning again to the action which takes place at the ejection-station, as the outer mold-unit is moved outwardly, the rear end of each ejector-sleeve 201 is adapted to engage the forward end of a stop-pin 239, the forward end of which is provided with a concentric cavity 240 opposite the rear end of the molding-pin of the ejector-sleeve. In the present embodiment, there are four stop-pins, one for each ejector-sleeve of a mold, these four stop-pins being secured at their rear ends to the head 241 of a piston 242 which is mounted in a cup-shaped air-cylinder 243 secured in an aperture of the end-plate 22 of the frame. The bottom 244 of the air-cylinder 243 is provided with four guide-apertures through which the stop-pins 239 project. The opposite end of the air-cylinder is adapted to be closed by a cover-plate 245 and sealed by packing 246, suitable bolts 247 being provided for fastening the assembled cylinder and cover to the end-plate 22. An air-supply tube 248 is connected to the cover-plate 245 and is arranged to bleed air into the cylinder in back of the piston-head 241 so as to provide an air-cushion for the stop-pins 239.

It should be noted that as the rear ends of the ejector-sleeves are brought into engagement with the stop-pins 239 by the outward movement of the outer mold-unit, the ejector-pins 202 are thrust forwardly into the respective mold-cavities to effect ejection of the molded buttons therefrom, the forward movement of the ejector-pins being independent of the molding-pins 214, each of which remains in its fully-advanced position in its respective mold-cavity. Thus, at the end of the ejection operation, both the ejector-pins 202 and the molding-pins 214 are fully advanced into the respective mold-cavities and remain it these positions until forced rearwardly from the mold-cavities by the influx of the molding material into the cavities at the charging-station.

*Operation*

The operation of the machine is believed to be clear from the foregoing description but may be briefly described as follows. When a mold is at the feeding station (see Fig. 3), a mold-charging composition preferably in the form of a preheated pill of a thermosetting or thermoplastic material is fed into the charging-bushing 193 of the mold. The mold is then indexed to the charging-station at which it is locked by the stop-mechanism, whereupon the mold-compressing shoe 98 is advanced by the drive-means, described above, into engagement with the outer cyclindrical face 188 of the outer mold-unit 187 to force the latter under a pressure of substantially 40,000 pounds into engagement with the inner mold-unit, at which time any slack between the locked outer and inner mold-units is taken up by the locking-bar actuating-members 230, as described above. While the respective mold-units are under this heavy compression, the mold-charging plunger 63 is advanced by the reciprocating connecting-rod 53 into the charging-bushing 193 of the outer mold-unit and compresses the pill therein. This pressure plus the heat of the preheated pill converts the pill into a substantially-fluid state in which it flows through the gates 217 and 218 of the die-blocks into the mold-cavities thereof. As the fluid-molding composition flows into the mold-cavities, the ejector-pins 202 and molding-pins 214 are forced outwardly from the mold-cavities, the outer ends 213 of the molding-pins being permitted to move into abutting engagement with the corresponding ends of the pusher-pins 65 due to the predetermined length of the slots 215 of the molding-pins. Similarly, the outward movement of each ejector-pin is positively limited by engagement of the inner end of the transverse slot 208 of its sleeve with its respective pin 207.

At the end of the forward mold-charging stroke of the plunger 63, substantially the entire contents of the charging-bushing 193 have been forced into the mold-cavities. Immediately preceding the end of the charging stroke, the pusher-pins 65, carried and actuated by the charging-plunger crosshead 58, are brought into engagement with the outer ends 213 of the molding-pins 214, so that on completion of the charging stroke the pusher-pins 65 will have moved each molding-pin 214 forwardly into the respective mold-cavities a distance corresponding to the required depth of the aperture to be formed in the molded button. Immediately after completion of the mold-charging operation, the charging-plunger 63 and mold-compressing shoe are retracted substantially simultaneously and the charged mold is indexed through substantially 90° to the re-sizing station. As the charged mold moves through this arc, the annular rims 166 of the spool-shaped roller 165 are adapted to ride on the cylindrical surface 188 of the outer mold-unit and to engage the outer ends of the molding-pins, in the event the latter have moved rearwardly out of the mold-cavity by the hydrostatic pressure therein, so as to positively return the molding-pins into the mold-cavity. At the re-sizing station, the charged mold is stopped and held in locked position by the Geneva drive-mechanism, while the rear ends of the molding-pins are again engaged and moved forwardly to project the molding-pins 214 into the apertures of the partially-cured buttons, the engagement of the molding-pins being accomplished at this time by the resiliently-mounted pusher-pins 122 which are brought into engagement with the outer ends of the molding-pins by movement of the carriage 106 and the hinged plate 118, as described above. While the charged mold is at the re-sizing station, the next succeeding mold is being simultaneously charged at the charging-station. Following the aperture re-sizing operation, the charged mold is indexed to the ejection-station, at which the charged mold is adapted to be positively unlocked and positively opened, the positive unlocking of the charged mold being accomplished by engagement of the locking-bars 177 with the fixed ramp-blocks 236 as the mold moves into the ejection-station. Simultaneously, the arcuate grooves 141 in opposite sides of the outer mold-unit move into engagement with the arcuate lips 140 of the respective cam-shoes 139 carried on the upright arms 138 of the reciprocable carriage-means 106, whereupon as the latter is advanced it positively carries the outer mold-unit outwardly away from its respective inner mold-unit, thereby opening the charged mold. Following the opening of the charged mold, the mold-cavities are cleaned by a blast of air from the goosenecks 153 of the air-tanks 142, the outer mold-unit then being carried back into engagement with its inner mold-unit by the retreating carriage 106. The closed mold is then indexed to the feeding-station to receive another preheated pill, the locking-bars 177 of the mold being automatically actuated as the indexing movement of the mold is initiated to automatically lock the inner and outer mold-units together.

In accordance with the improved molding machine of this invention, molded buttons of a thermosetting plastic material may be produced in great rapidity and of highly uniform and superior construction. In the embodiment shown, each mold embodies four mold-cavities and the cycle of operations consumes substantially 16 seconds, as a consequence of which the machine has a high rate of production. It will be appreciated, however, that each mold may comprise fewer or more than four mold-cavities and that the speed of rotation of the mold-rotor may be increased or decreased depending upon such factors as the curing time of the plastic material being used, the volume of the molded article, etc.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A molding machine, including in combination: a rotary mold-carrying member; a plurality of molding-means arranged in an annular series on the periphery of said mold-carrying member, each molding-means having a mold-cavity and a transfer-passage, the longitudinal axis of the transfer-passage of each molding-means extending radially of said rotary mold-carrying member and communicating with said mold-cavity; a molding-means feeding-station and a molding-means charging-station spaced circumferentially about the said rotary mold-carrying member; indexing-means arranged to automatically rotate said mold-carrying member intermittently and in one direction to sequentially carry said respective molding-means opposite said molding-means feeding-station for feeding a unit-charge into the transfer-passage of each molding-means, and then opposite said molding-means charging-station; and mold-charging means at said charging-station movable toward and away from said mold-carrying member in a direction substantially radially with respect thereto and constructed and arranged to sequentially cooperate with the respective molding-means as the same are sequentially turned into registry with the said mold-charging means to force the said unit-charge out of the respective transfer-passage of each molding-means and into the mold-cavity thereof.

2. A molding machine, including in combination: a rotary mold-carrying member; a plurality of molding-means arranged in an annular series on the periphery of said mold-carrying member, each molding-means having a mold-cavity and a transfer-passage, the longitudinal axis of the transfer-passage of each molding-means extending radially of said rotary mold-carrying member and communicating with said mold-cavity; mold-charging means movable toward and away from said mold-carrying member in a direction substantially radially with respect thereto and constructed and arranged to sequentially cooperate with the respective molding-means as the same are sequentially turned into registry with the said charging-means to force a charge through the respective transfer-passage of each molding-means and into the mold-cavity thereof; indexing-means constructed and arranged to impart step-by-step rotary movement to said mold-carrying member to sequentially present the respective transfer-passage of each of the plurality of molding-means to the action of said charging-means; a molding-pin mounted in each of said molding-means; and an element actuated by said mold-charging means constructed and arranged to thrust a molding-pin into the mold-cavity of each respective molding-means after the mold-cavity thereof has been charged by said mold-charging means.

3. A molding machine, including in combination: a rotary mold-carrying member; a plurality of pairs of mold-units arranged in an annular series on the periphery of said mold-carrying member, each of the said pairs of mold-units together providing a mold-cavity, and one mold-unit of each pair being movable toward and away from its complemental mold-unit in a direction substantially radially with respect to the said rotary mold-carrying member, one of the mold-units of each of said pairs being provided also with a transfer-passage extending radially of said rotary mold-carrying member and communicating with the said mold-cavity; mold-charging means movable toward and away from said mold-carrying member in a direction substantially radially with respect thereto and constructed and arranged to sequentially cooperate with the transfer-passage of each of the plurality of pairs of mold-units as the same are sequentially turned into registry with the said charging-means to force a charge through the respective transfer-passage of each of the plurality of pairs of mold-units into the mold-cavity thereof; and indexing-means constructed and arranged to impart step-by-step rotary movement to the said mold-carrying member to sequentially present the respective transfer-passage of each of the said plurality of pairs of mold-units to the action of the said mold-charging means.

4. A molding machine, including in combination: a rotary mold-carrying member; a plurality of pairs of mold-units arranged in an annular series on the periphery of said mold-carrying member, each of the said pairs of mold-units together providing a mold-cavity, and one mold-unit of each pair being movable toward and away from its complemental mold-unit in a direction substantially radially with respect to the said rotary mold-carrying member, one of the mold-units of each of said pairs being provided also with a transfer-passage extending radially of said rotary mold-carrying member and communicating with the said mold-cavity; mold-charging means movable toward and away from said mold-carrying member in a direction substantially radially with respect thereto and constructed and arranged to sequentially cooperate with the transfer-passage of each of the plurality of pairs of mold-units as the same are sequentially turned into registry with the said charging-means to force a charge through the respective transfer-passage of each of the plurality of pairs of mold-units into the mold-cavity thereof; indexing-means constructed and arranged to impart step-by-step rotary movement to the said mold-carrying member to sequentially present the respective transfer passage of each of the said plurality of pairs of mold-units to the action of the said charging-means; a molding-pin mounted in one mold-unit of each pair of mold-units and an element actuated by said mold-charging means constructed and arranged to thrust a molding-pin into the mold-cavity of each respective pair of mold-units after the mold-cavity thereof has been charged by said mold-charging means.

5. A molding machine, including in combination: a rotary mold-carrying member; a plurality of molding-means arranged in an annular series on the periphery of said mold-carrying member, each molding-means having a mold-cavity and a transfer-passage, the longitudinal axis of the transfer-passage of each molding-means extending radially of said rotary mold-carrying member and communicating with said mold-cavity; mold-charging means movable toward and away from said mold-carrying member in a direction substantially radially with respect thereto and constructed and arranged to sequentially cooperate with the respective molding-means as the same are sequentially turned into registry with the said mold-charging means to force a charge through the respective transfer-passage of each molding-means and into the mold-cavity thereof; a molding-pin mounted in each of said molding-means for rotation therewith; thrust-means independent of said molding-pin and arranged radially of said mold-carrying member so as to be aligned axially with the molding-pin of one of said molding-means when one of said molding-means is opposite said mold-charging means; and means to actuate said thrust-means so as to engage and thrust the respective molding-pin into the charged mold-cavity of the said molding-means; and indexing-means constructed and arranged to impart step-by-step rotary movement to said mold-carrying member to sequentially present the respective transfer-passage of each of the plurality of molding-means to the action of said mold-charging means and the molding-pin of each charged molding-means to the action of said thrust-means.

6. A molding machine, including in combination: a rotary mold-carrying member; a plurality of molding-means arranged in an annular series on the periphery of said mold-carrying member, each molding-means having a mold-cavity and a transfer-passage, the longitudinal axis of the transfer-passage of each molding-means extending radially of said rotary mold-carrying member and communicating with said mold-cavity; mold-charging means movable toward and away from said mold-carrying member in a direction substantially radially with respect thereto and constructed and arranged to sequentially cooperate with the respective molding-means as the same are sequentially turned into registry with the said mold-charging means to force a charge through the respective transfer-passage of each molding-means and into the mold-cavity thereof; a molding-means compressing-member cooperatively associated with said mold-charging means and movable toward and away from said mold-carrying member in a direction substantially radially with respect thereto to sequentially cooperate with each of the plurality of molding-means as the same are sequentially turned into registry with the mold-charging means to tightly compress the molding-means; indexing-means constructed and arranged to impart step-by-step rotary movement to said mold-carrying member to sequentially present the respective transfer-passage of each of the plurality of molding-means to the action of said mold-charging means and said molding-means compressing-member; a molding-pin mounted in each of said molding-means; and an element supported by said molding-means compressing-member and actuated by said mold-charging means to thrust a molding-pin into the mold-cavity of each respective molding-means after the mold-cavity thereof has been charged by said mold-charging means.

7. A molding machine, including in combination: a rotary mold-carrying member; a plurality of pairs of mold-units arranged in an annular series on the periphery of said mold-carrying member, each of the said pairs of mold-units together providing a mold-cavity, and one mold-unit of each pair being movable toward and away from its complemental mold-unit in a direction substantially radially with respect to the said rotary mold-carrying member, one of the mold-units of each of said pairs being provided also with a transfer-passage extending radially of said rotary mold-carrying member and communicating with the said mold-cavity; mold-charging means movable toward and away from said mold-carrying member in a direction substantially radially with respect thereto and constructed and arranged to sequentially cooperate with the transfer-passage of each of the plurality of pairs of mold-units as the same are sequentially turned into registry with the said mold-charging means to force a charge through the respective transfer-passage of each of the plurality of pairs of mold-units into the mold-cavity thereof; a mold-unit compressing-member cooperatively associated with said mold-charging means and movable toward and away from said mold-carrying member in a direction substantially radially with respect thereto, to sequentially cooperate with one of the mold-units of each of said pairs of mold-units as the same are sequentially turned into registry with the mold-charging means to move the one mold-unit toward and into tightly compressed engagement with its corresponding mold-unit; and indexing-means constructed and arranged to impart step-by-step rotary movement to the said mold-carrying member to sequentially present the respective transfer-passage of each of the said plurality of pairs of mold-units to the action of said charging-means and said mold-unit compressing-member.

8. A molding machine, including in combination: a rotary mold-carrying member; a plurality of pairs of mold-units arranged in an annular series on the periphery of said mold-carrying member, each of the said pairs of mold-units together providing a mold-cavity, and one mold-unit of each pair being movable toward and away from its complemental mold-unit in a direction substantially radially with respect to the said rotary mold-carrying member, one of the mold-units of each of said pairs being provided also with a transfer-passage extending radially of said rotary mold-carrying member and communicating with the said mold-cavity; mold-charging means movable toward and away from said mold-carrying member in a direction substantially radially with respect thereto and constructed and arranged to sequentially cooperate with the transfer-passage of each of the plurality of pairs of mold-units as the same are sequentially turned into registry with the said mold-charging means to force a charge through the respective transfer-passage of each of the plurality of pairs of mold-units into the mold-cavity thereof; a mold-unit compressing-member cooperatively associated with said mold-charging means and movable toward and away from said mold-carrying member in a direction substantially radially with respect thereto, to sequentially cooperate with one of the mold-units of each of said pairs of mold-units as the same are sequentially turned into registry with the mold-unit compressing-member to positively move the one mold-unit toward and into tightly compressed engagement with its corresponding mold-unit; indexing-means constructed and arranged to impart step-by-step rotary movement to the said mold-carrying member to sequentially present the respective transfer-passage of each of the said plurality of pairs of mold-units to the action of said charging-means and said mold-unit compressing-member; a molding-pin mounted in one mold-unit of each pair of mold-units; and an element supported by said mold-unit compressing-member and actuated by said mold-unit charging-means to thrust a molding-pin into the mold cavity of each respective pair of mold-units after the mold-cavity thereof has been charged by said mold-charging means.

9. A molding machine, including in combination: a rotary mold-carrying member; a plurality of radially-separable molding-means arranged in an annular series on the periphery of said mold-carrying member, each radially-separable molding-means having a mold-cavity and a transfer-passage, the longitudinal axis of the transfer-passage of each radially-separable molding-means extending radially of said rotary mold-carrying member and communicating with said mold-cavity; a molding-means feeding-station, a molding-means charging-station, and an ejection-station spaced circumferentially about said rotary mold-carrying member; indexing-means arranged to automatically rotate said mold-carrying member intermittently and in one direction to sequentially carry said respective radially-separable molding-means opposite said molding-means feeding-station for feeding a unit-charge into the transfer-passage of each molding-means, and then opposite said molding-means charging-station and said ejection-station; mold-charging means at said charging-station movable toward and away from said mold-carrying member in a direction substantially radially with respect thereto and constructed and arranged to sequentially cooperate with the respective radially-separable molding-means as the same is sequentially turned into registry with the said mold-charging means to force the said unit-charge out of the transfer-passage of each respective radially-separable molding-means and into the mold-cavity thereof; and molding-means locking-members comprising fixed elements and movable elements carried by said rotary mold-carrying member, said movable elements being constructed and arranged to cooperate sequentially with said fixed elements to hold said radially-separable molding-means locked together as said molding-means is moved intermittently from said charging-station to said ejection-station and to unlock said radially-separable molding-means at said ejection-station.

10. A molding machine, including in combination: a rotary mold-carrying member; a plurality of pairs of mold-units arranged in an annular series on the periphery of said mold-carrying member, each of the said pairs of mold-units together providing a mold-cavity, and one mold-unit of each pair being movable toward and away from its complemental mold-unit in a direction substantially radially with respect to the said rotary mold-carrying member, one of the mold-units of each of said pairs being provided also with a transfer-passage extending radially of said rotary mold-carrying member and communicating with the said mold-cavity; mold-charging means movable toward and away from said mold-carrying member in a direction substantially radially with respect thereto and constructed and arranged to sequentially cooperate with the transfer-passage of each of the plurality of pairs of mold-units as the same are sequentially turned into registry with the said mold-charging means to force a charge through the transfer-passage of each of the plurality of pairs of mold-units into the mold-cavity thereof; mold-unit locking-members comprising fixed elements and movable elements, said movable elements being carried by one mold-unit of each pair of mold-units and constructed and arranged to cooperate sequentially with said fixed elements to lock and unlock said pairs of mold-units; and indexing-means constructed and arranged to impart step-by-step rotary movement to the said mold-carrying member to sequentially present the respective transfer-passage of each of the said plurality of pairs of mold-units to the action of the said mold-charging means.

11. A molding machine, including in combination: a rotary mold-carrying member; a plurality of radially-separable molding-means arranged in an annular series on the periphery of said mold-carrying member, each radially-separable molding-means having a mold-cavity and a transfer-passage, the longitudinal axis of the transfer-passage of each radially-separable molding-means extending radially of said rotary mold-carrying member and communicating with said mold-cavity; a molding-means feeding station, a molding-means charging-station, and an ejection-station spaced circumferentially about said rotary mold-carrying member; indexing-means arranged to automatically rotate said mold-carrying member intermittently and in one direction to sequentially carry said respective radially-separable molding-means opposite said molding-means feeding-station for feeding a unit-charge into the transfer-passage of each molding-means, and then opposite said molding-means charging-station and said ejection-station; mold-charging means at said charging-station movable toward and away from said mold-carrying member in a direction substantially radially with respect thereto and constructed and arranged to sequentially cooperate with the respective radially-separable molding-means as the same are sequentially turned into registry with the said mold-charging means to force the said unit-charge out of the respective transfer-passage of each separable molding-means and into the mold-cavity thereof; a molding-means compressing-member cooperatively associated with the said mold-charging means and movable toward and away from said mold-carrying member in a direction substantially radially with respect thereto to cooperate with each of the plurality of radially-separable molding-means as the same are sequentially turned into registry with the mold-charging means to subject said radially-separable molding-means to a high-compression pressure during the displacement of the unit-charge from the respective transfer-passage of each radially-separable molding-means into the mold-cavity thereof and thereafter to release the high-compression pressure from said radially-separable molding-means; and molding-means locking-members constructed and arranged to hold the charged radially-separable molding-means locked together while said charged molding-means are moved intermittently from said charging-station to said ejection-station.

12. A molding machine, including in combination: a rotary mold-carrying member; a plurality of separable molding-means arranged in an annular series on the periphery of said mold-carrying member, each separable molding-means having a mold-cavity and a transfer-passage, the longitudinal axis of the transfer-passage of each separable molding-means extending radially of said rotary mold-carrying member and communicating with said mold-cavity; mold-charging means movable toward and away from said mold-carrying member in a direction substantially radially with respect thereto and constructed and arranged to sequentially cooperate with the respective separable molding-means as the same are sequentially turned into registry with the said mold-charging means to force a charge through the respective transfer-passage of each separable molding-means and into the mold-cavity thereof; a molding-means compressing-member cooperatively associated with said mold-charging means and movable toward and away from said mold-carrying member in a direction substantially radially with respect thereto to sequentially cooperate with each of the plurality of separable molding-means as the same are sequentially turned into registry with the mold-charging means to tightly compress the separable molding-means; molding-means locking-members comprising fixed elements and movable elements the latter being carried by said rotary mold-carrying member and constructed and arranged to cooperate with said fixed elements to lock said separable molding-means after the latter have been compressed tightly together by said compressing-member; indexing-means constructed and arranged to impart step-by-step rotary movement to the said mold-carrying member to sequentially present the respective transfer-passage of each of the plurality of separable molding-means to the action of said mold-charging means; a molding-pin mounted in each of said separable molding-means; and an element supported by said molding-means compressing-member and actuated by said mold-charging means to thrust a molding-pin into the mold-cavity of the respective separable molding-means after the mold-cavity thereof has been charged by said mold-charging means.

13. A molding machine, including in combination: a rotary mold-carrying member; a plurality of separable molding-means arranged in an annular series on the periphery of said mold-carrying member, each separable molding-means having a mold-cavity and a transfer-passage, the longitudinal axis of the transfer-passage of each separable molding-means extending radially of said rotary mold-carrying member and communicating with said mold-cavity; mold-charging means movable toward and away from said mold-carrying member in a direction substantially radially with respect thereto and constructed and arranged to sequentially cooperate with the respective separable molding-means as the same are sequentially turned into registry with the said mold-charging means to force a charge through the respective transfer-passage of each separable molding-means and into the mold-cavity thereof; a molding-means compressing-member cooperatively associated with said mold-charging means and movable toward and away from said mold-carrying member in a direction substantially radially with respect thereto to sequentially cooperate with each of the plurality of separable molding-means as the same are sequentially turned into registry with the mold-charging means to tightly compress the separable molding-means; molding-means separating-means movable toward and away from said mold-carrying member in a direction substantially radially with respect thereto, and constructed and arranged to sequentially cooperate with the respective separable molding-means as the same are sequentially turned into registry therewith to separate said molding-means; and indexing-means constructed and arranged to impart step-by-step rotary movement to said mold-carrying member to sequentially present the respective transfer-passage of each of the plurality of separable molding-means to the action of said mold-charging means and thereafter to present said separable molding-means to the action of said separating-means.

14. A molding machine, including in combination: a rotary mold-carrying member; a plurality of separable molding-means arranged in an annular series on the periphery of said mold-carrying member, each separable molding-means having a mold-cavity and a transfer-passage, the longitudinal axis of the transfer-passage of each separable molding-means extending radially of said rotary mold-carrying member and communicating with said mold-cavity; mold-charging means movable toward and away from said mold-carrying member in a direction substantially radially with respect thereto and constructed and arranged to sequentially cooperate with the respective separable molding-means as the same are sequentially turned into registry with the said charging-means to force a charge through the respective transfer-passage of each separable molding-means and into the mold-cavity thereof; a molding-means compressing-member cooperatively associated with said mold-charging means and movable toward and away from said mold-carrying member in a direction substantially radially with respect thereto to sequentially cooperate with each of the plurality of separable molding-means as the same are sequentially turned into registry with the mold-charging means to tightly compress the separable molding-means; molding-means separating-means movable toward and away from said mold-carrying member in a direction substantially radially with respect thereto, and constructed and arranged to sequentially cooperate with the respective separable molding-means as the same are sequentially turned into registry therewith to separate said molding-means; indexing-means constructed and arranged to impart step-by-step rotary movement to said mold-carrying member to sequentially present the respective transfer-passage of each of the plurality of separable molding-means to the action of said charging-means; a molding-pin mounted in each of said separable molding-means; and an element actuated by said molding-means separating-means and acting simultaneously with the separation of one of said separable molding-means to thrust said molding-pin into the mold-cavity of the separable molding-means next succeeding the separated molding-means.

15. A molding machine, including in combination: a rotary mold-carrying member; a plurality of separable molding-means arranged in an annular series on the periphery of said mold-carrying member, each separable molding-means having a mold-cavity and a transfer-passage, the longitudinal axis of the transfer-passage of each separable molding-means extending radially of said rotary mold-carrying member and communicating with said mold-cavity; mold-charging means movable toward and away from said mold-carrying member in a direction substantially radially with respect thereto and constructed and arranged to sequentially cooperate with the respective separable molding-means as the same are sequentially turned into registry with the said mold-charging means to force a charge through the respective transfer-passage of each separable molding-means and into the mold-cavity thereof; a molding-means compressing-member cooperatively associated with said mold-charging means and movable toward and away from said mold-carrying member in a direction substantially radial with respect thereto to sequentially cooperate with each of the plurality of separable molding-means as the same are sequentially turned into registry with the mold-charging means to tightly compress the separable molding-means; molding-means separating-means movable toward and away from said mold-carrying member in a direction substantially radial with respect thereto, and having a coupling-element arranged to sequentially cooperate with a coupling-element of the respective separable molding-means as the same are sequentially turned into registry therewith to separate said molding-means; ejector-means comprising a stop-member and an ejector-member, said ejector-member being carried by said molding-means and moved by said molding-means separating-means into engagement with said stop-member to eject a molded article from said separated molding-means; and indexing-means constructed and arranged to impart step-by-step rotary movement to said mold-carrying member to sequentially present the respective transfer-passage of each of the plurality of molding-means to the action of said mold-charging means and said separable molding-means to the action of said separating-means and said ejector-means.

16. A molding machine, including in combination: a rotary mold-carrying member; a plurality of molding-means arranged in an annular series on the periphery of said mold-carrying member and each having a mold-cavity and a charge-holding portion, the longitudinal axis of the charge-holding portion of each molding-means extending radially of said rotary mold-carrying member and communicating with said mold-cavity; a molding-means feeding-station and a molding-means charging-station spaced circumferentially about said rotary mold-carrying member; indexing-means arranged to automatically rotate said mold-carrying member intermittently and in one direction to sequentially carry said respective molding-means opposite said molding-means feeding-station for feeding a unit-charge into the transfer-passage of each molding-means and then opposite said molding-means charging-station; mold-charging means at said charging-station movable toward and away from said mold-carrying member in a direction substantially radially with respect thereto and constructed and arranged to sequentially cooperate with the respective charge-holding portion of each of the plurality of molding-means as the same are sequentially turned into registry with the said mold-charging means to force the said unit-charge out of the said charge-holding portion into the mold-cavity; a molding-pin mounted in each of the said molding-means for rotation therewith; and a thrust-pin independent of said molding-pin and arranged radially of said mold-carrying member so as to be aligned axially with the molding-pin of the molding-means at a station next-succeeding the molding-means charging-station; and means at said next-succeeding station to actuate said thrust-pin so as to engage and thrust the said molding-pin into the charged mold-cavity of the molding-means.

17. A molding machine, including in combination: a rotary mold-carrying member; a plurality of molding-means arranged in an annular series on said mold-carrying member, each molding-means having a mold-cavity and a transfer-passage, said transfer-passage communicating with said mold-cavity; mold-charging means movable toward and away from said mold-carrying member and constructed and arranged to sequentially cooperate with the molding-means as the same are sequentially turned into registry with the said mold-charging means to force a charge through the respective transfer-passage of each molding-means into the mold-cavity thereof; indexing-means constructed and arranged to impart step-by-step rotary movement to said mold-carrying member to sequentially present the respective transfer-passage of each of the plurality of molding-means to the action of said mold-charging means; a molding-pin mounted in each of said molding-means; and an element actuated by said charging-means constructed and arranged to thrust a molding-pin into the mold-cavity of each respective molding-means after the mold-cavity thereof has been charged by said mold-charging means.

18. A molding machine, including in combination: a rotary mold-carrying member; a plurality of pairs of mold-units arranged in an annular series on said mold-carrying member, each of said pairs of mold-units together providing a plurality of mold-cavities and one mold-unit of each pair being movable toward and away from its complemental mold-unit to close and open said mold-cavities respectively, one of the mold-units of each of said pairs being provided also with a charge-holding chamber communicating with said mold-cavities; mold-charging means movable toward and away from said mold-carrying member and constructed and arranged to sequentially cooperate with the pairs of mold-units as the same are sequentially turned into registry with the said mold-charging means to force a charge through the charge-holding chamber of said one mold-unit into said mold-cavities; indexing-means constructed and arranged to impart step-by-step rotary movement to said mold-carrying member to sequentially present the respective charge-holding chamber of each pair of mold-units to the action of said mold-charging means; molding-pins mounted in each of said pairs of mold-units opposite each respective mold-cavity thereof; and molding-pin advancing-elements for each respective molding-pin constructed and arranged to be actuated by said mold-charging means to engage and thrust each respective molding-pin into its corresponding mold-cavity of each pair of mold-units after the mold-cavities thereof have been charged by said mold-charging means.

19. A molding machine, including in combination: a rotary mold-carrying member; a plurality of pairs of mold-units arranged in an annular series on said mold-carrying member, each of said pairs of mold units together providing a plurality of mold-cavities and one mold-unit of each pair being movable toward and away from its complemental mold-unit to close and open said mold-cavities respectively, one of the mold-units of each of said pairs being provided also with a charge-holding chamber communicating with said mold-cavities; mold-charging means movable toward and away from said mold-carrying member and constructed and arranged to sequentially cooperate with the pairs of mold-units as the same are sequentially turned into registry with the said mold-charging means to force a charge through the charge-holding chamber of said one mold-unit into said mold-cavities; indexing-means constructed and arranged to impart step-by-step rotary movement to said mold-carrying member to sequentially present the respective charge-holding chamber of each pair of mold-units to the action of said mold-charging means; ejectors mounted in each of said pairs of mold-units opposite each respective mold-cavity thereof; a molding-pin supported by each ejector; and molding-pin advancing-elements for each respective molding-pin constructed and arranged to be actuated by said mold-charging means to engage and thrust each respective molding-pin into its corresponding mold-cavity of each pair of mold-units after the mold-cavities thereof have been charged by said mold-charging means.

20. A molding machine, including in combination: a rotary mold-carrying member; a plurality of pairs of mold-units arranged in an annular series on said mold-carry member, each of said pairs of mold units together providing a plurality of mold-cavities and one mold-unit of each pair being movable toward and away from its complemental mold-unit to close and open said mold-cavities respectively, one of the mold-units of each of said pairs being provided also with a charge-holding chamber communicating with said mold-cavities; a molding-means feeding-station, a molding-means charging-station and an ejection-station spaced circumferentially about said rotary mold-carrying member; mold-charging means at said charging-station movable toward and away from said mold-carrying member and constructed and arranged to sequentially cooperate with the pairs of mold-units as the same are sequentially rotated into registry with the said mold-charging means at said charging-station to force a charge through the charge-holding chamber of said one-mold unit into said mold-cavity; indexing-means constructed and arranged to impart step-by-step rotary movement to said mold-carrying member to sequentially present the respective charge-holding chamber of each pair of mold-units to the action of said mold-charging means at said charging-station and then to said ejection-station; ejectors mounted in each of said pairs of mold-units opposite each respective mold-cavity thereof; a stop-member arranged radially of said mold-carrying member at said ejection-station; mold-unit separating-means having a coupling-element arranged to sequentially cooperate with a coupling-element of the respective pairs of mold-units as the same are sequentially turned into registry therewith to separate said pairs of mold-units, the said separating-means being constructed and arranged simultaneously to move said ejectors into engagement with said stop-members to eject molded articles from the cavities of the separated mold-units at said ejection-station.

21. A molding machine, including in combination: a rotary mold-carrying member; a plurality of pairs of mold-units arranged in an annular series on said mold-carrying member, each of said pairs of mold-units together providing a plurality of mold-cavities and one mold-unit of each pair being movable toward and away from its complemental mold-unit to close and open said mold-cavities respectively, one of the mold-units of each of said pairs being provided also with a charge-holding chamber communicating with said mold-cavities; mold-charging means movable toward and away from said mold-carrying member and constructed and arranged to sequentially cooperate with the pairs of molding-units as the same are sequentially turned into registry with the said mold-charging means to force a charge through the charge-holding chamber of said one mold-unit into said mold-cavities; indexing-means constructed and arranged to impart step-by-step rotary movement to said mold-carrying member to sequentially present the respective charge-holding chamber of each pair of mold-units to the action of said mold-charging means; a molding-pin mounted in each of said pairs of mold-units opposite each respective mold-cavity thereof; mold-unit separating-means constructed and arranged to sequentially cooperate with the respective pairs of mold-units as the same are sequentially turned into registry therewith to separate said mold-units; and molding-pin advancing-elements actuated simultaneously by said mold-unit separating-means to engage and thrust each respective molding-pin of the pair of mold-units immediately preceding the separated pair of mold-units into its respective mold-cavity.

22. A molding machine, including in combination: a rotary mold-carrying member; a plurality of pairs of mold-units arranged in an annular series on the periphery of said mold-carrying member, each of said pairs of mold-units together providing a plurality of mold-cavities and one mold-unit of each pair being movable toward and away from its complemental mold-unit in a direction substantially radially with respect to said rotary mold-carrying member to close and open said mold-cavities respectively, one of the mold-units of each of said pairs being provided also with a charge-holding chamber extending radially of said rotary mold-carrying member and communicating with said mold-cavities; mold-charging means movable toward and away from said mold-carrying member in a direction susbtantially radially thereto and constructed and arranged to sequentially cooperate with the pairs of mold-units as the same are sequentially turned into registry with the said mold-charging means to force a charge through the charge-holding chamber of said one mold-unit into said mold-cavities; indexing-means constructed and arranged to impart step-by-step rotary movement to said mold-carrying member to sequentially present the respective charge-holding chamber of each pair of mold-units to the action of said mold-charging means; an ejector mounted in each of said pairs of mold-units opposite the mold-cavity thereof; mold-unit separating-means comprising a reciprocal carriage having a mold-unit cooperating-portion movable radially of said mold-carrying member; and means to reciprocate said carriage to move said mold-unit cooperating-portion thereof radially so as to sequentially engage one mold-unit of each respective pair of mold-units as the same are sequentially turned into registry therewith to separate said mold-units, said mold-unit cooperating-portion of said reciprocal carriage being arranged simultaneously to actuate said ejector to eject a molded article from the mold-cavity of the separated mold-unit.

23. A molding machine, including in combination: a rotary mold-carrying member; a plurality of pairs of mold-units arranged in an annular series on the periphery of said mold-carrying member, each of said pairs of mold-units together providing a plurality of mold-cavities and one mold-unit of each pair being movable toward and away from its complemental mold-unit in a direction substantially radially with respect to said rotary mold-carrying member to close and open said mold-cavities respectively, one of the mold-units of each of said pairs being provided also with a charge-holding chamber extending radially of said rotary mold-carrying member and communicating with said mold-cavities; mold-charging means movable toward and away from said mold-carrying member in a direction substantially radially thereto and constructed and arranged to sequentially cooperate with the pairs of mold-units as the same are sequentially turned into registry with the said mold-charging means to force a charge through the charge-holding chamber of said one mold-unit into said mold-cavities; indexing-means constructed and arranged to impart step-by-step rotary movement to said mold-carrying member to sequentially present the respective charge-holding chamber of each pair of mold-units to the action of said mold-charging means; and means to successively open and close each pair of mold-units comprising a reciprocal carriage having a mold-unit engaging-portion movable radially of said mold-carrying member; and means to reciprocate said carriage to move the mold-unit engaging-portion of said carriage radially so as to successively open and close each pair of mold-units during the interval of one step in the step-by-step movement of said indexing-means.

24. A molding machine, including in combination: a rotary mold-carrying member; a plurality of pairs of mold-units arranged in an annular series on the periphery of said mold-carrying member, each of said pairs of mold-units together providing a plurality of mold-cavities and one mold-unit of each pair being movable toward and away from its complemental mold-unit in a direction substantially radially with respect to said rotary mold-carrying member to close and open said mold-cavities respectively, one of the mold-units of each of said pairs being provided also with a charge-holding chamber extending radially of said rotary mold-carrying member and communicating with said mold-cavities; mold-charging means movable toward and away from said mold-carrying member in a direction substantially radially thereto and constructed and arranged to sequentially cooperate with the pairs of mold-units as the same are sequentially turned into registry with the said mold-charging means to force a charge through the charge-holding chamber of said one mold-unit into said mold-cavities; indexing-means constructed and arranged to impart step-by-step rotary movement to said mold-carrying member to sequentially present the respective charge-holding chamber of each pair of mold-units to the action of said mold-charging means; means to successively open and close each pair of mold-units comprising a reciprocal carriage having a mold-unit engaging-portion movable radially of said mold-carrying member; means to positively advance said carriage to open each pair of mold-units; and resilient-means to retract said carriage to close each pair of open mold-units, said carriage-advancing-and-retracting means being constructed and arranged to move said carriage through its mold-unit opening-and-closing cycle during the interval of one step in the step-by-step movement of said indexing-means.

25. A molding machine, including in combination: a rotary mold-carrying member; a plurality of pairs of mold-units arranged in an annular series on the periphery of said mold-carrying member, each of the said pairs of mold-units together providing a mold-cavity; mold-unit guide-means for each respective pair of mold-units, one mold-unit of each pair being movable on said guide-means toward and away from its complemental mold-unit in a direction substantially radial with respect to the said rotary mold-carrying member, one of the mold-units of each of said pairs being provided also with a transfer-passage extending radially of said rotary mold-carrying member and communicating with the said mold-cavity; mold-charging means movable toward and away from said mold-carrying member in a direction substantially radial with respect thereto and constructed and arranged to sequentially cooperate with the transfer-passage of each of the plurality of pairs of mold-units as the same are sequentially turned into registry with the said mold-charging means to force a charge through the transfer-passage of each of the plurality of pairs of mold-units into the mold-cavity thereof; mold-unit locking-members comprising fixed elements and movable elements, the latter being carried by one mold-unit of each pair of mold-units and constructed and arranged to cooperate sequentially with said mold-unit guide-means to lock and unlock the one mold-unit from its complemental mold-unit; and indexing-means constructed and arranged to impart step-by-step rotary movement to the said mold-carrying member to sequentially present the respective transfer-passage of each of the said plurality of pairs of mold-units to the action of said mold-charging means and to actuate said movable locking-elements by moving the latter into engagement with said fixed locking-elements.

FORREST G. PURINTON.

REFERENCES CITED

The following references are of record in the file of this patent:

UNITED STATES PATENTS

| Number | Name | Date |
|---|---|---|
| 2,055,742 | Burke | Sept. 29, 1936 |
| 2,111,857 | Jeffery | Mar. 22, 1938 |
| 2,327,227 | Tucker | Aug. 17, 1943 |
| 2,333,056 | Thoreson et al. | Oct. 26, 1943 |
| 2,351,774 | McGowen | June 20, 1944 |

FOREIGN PATENTS

| Number | Country | Date |
|---|---|---|
| 525,024 | Great Britain | Aug. 20, 1940 |